United States Patent
Kim et al.

(10) Patent No.: US 11,924,877 B2
(45) Date of Patent: Mar. 5, 2024

(54) METHOD AND DEVICE FOR BASE STATION TO REPORT LBT FAILURE INFORMATION IN NEXT-GENERATION MOBILE COMMUNICATION SYSTEM OPERATING IN UNLICENSED FREQUENCY BAND

(71) Applicant: Samsung Electronics Co., Ltd., Suwon-si (KR)

(72) Inventors: Sangbum Kim, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 449 days.

(21) Appl. No.: 17/250,910

(22) PCT Filed: Sep. 11, 2019

(86) PCT No.: PCT/KR2019/011849
§ 371 (c)(1),
(2) Date: Mar. 25, 2021

(87) PCT Pub. No.: WO2020/067667
PCT Pub. Date: Apr. 2, 2020

(65) Prior Publication Data
US 2021/0345405 A1    Nov. 4, 2021

(30) Foreign Application Priority Data

Sep. 27, 2018 (KR) .................. 10-2018-0114970
Mar. 12, 2019 (KR) .................. 10-2019-0027954

(51) Int. Cl.
*H04W 74/08* (2009.01)
*H04W 24/10* (2009.01)
*H04W 76/19* (2018.01)

(52) U.S. Cl.
CPC ....... *H04W 74/0816* (2013.01); *H04W 24/10* (2013.01); *H04W 76/19* (2018.02)

(58) Field of Classification Search
CPC ... H04W 28/04; H04W 72/04; H04W 72/042; H04W 88/08; H04W 74/0816; H04W 76/19; H04W 24/10
(Continued)

(56) References Cited

U.S. PATENT DOCUMENTS 10,075,275 B2     9/2018  Narasimha et al.
2018/0242357 A1*  8/2018  Khirallah .............. H04L 1/1896
(Continued)

FOREIGN PATENT DOCUMENTS

KR   10-2018-0074689 A    7/2018
KR      201874689 A   *   7/2018 ............ H04W 74/08
(Continued)

OTHER PUBLICATIONS

3GPP TSG-RAN WG2 meeting #103, Gothenburg, Sweden, Aug. 20-24, 2018, R2-1811286, Agenda item: 11.2.2.2, Source: ZTE, Title: Simulation and Evaluation for RLM/RLF on NR-U. (Year: 2018).*

(Continued)

*Primary Examiner* — Peter G Solinsky
*Assistant Examiner* — Sanjay K Dewan

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety (Continued)

services. Disclosed are a method and a device for a terminal to indicate whether LBT has failed or not and declare a detected LBT failure, in report mechanisms such as RLF, SCG failure, establishment failure, and MDT.

12 Claims, 20 Drawing Sheets

(58) Field of Classification Search
USPC .......................................................... 370/329
See application file for complete search history.

(56) References Cited

U.S. PATENT DOCUMENTS

| | | |
|---|---|---|
| 2018/0352573 A1 | 12/2018 | Yang et al. |
| 2019/0053082 A1 | 2/2019 | Alriksson et al. |
| 2023/0008394 A1* | 1/2023 | Wegmann ......... H04W 36/0058 |

FOREIGN PATENT DOCUMENTS

| | | | | |
|---|---|---|---|---|
| SE | WO 2017/178973 A1 * | 4/2017 | ............ | H04W 76/02 |
| SE | WO 2017/144514 A1 * | 8/2017 | ............ | H04W 16/14 |
| SE | WO 2023/043360 A1 * | 3/2023 | ............ | H04W 24/02 |
| WO | 2017144514 A1 | 8/2017 | | |
| WO | 2017178973 A1 | 10/2017 | | |

OTHER PUBLICATIONS

International Search Report and Written Opinion of the International Searching Authority related to International Application No. PCT/KR2019/011849 dated Dec. 19, 2019, 9 pages.

ZTE, "Simulation and Evaluation for RLM/RLF on NR-U," R2-1811286, 3GPP TSG-RAN WG2 meeting #103, Gothenburg, Sweden, Aug. 20-24, 2018, 4 pages.

* cited by examiner

METHOD AND DEVICE FOR BASE STATION TO REPORT LBT FAILURE INFORMATION IN NEXT-GENERATION MOBILE COMMUNICATION SYSTEM OPERATING IN UNLICENSED FREQUENCY BAND

CROSS-REFERENCE TO RELATED APPLICATIONS

This application is a 371 National Stage of International Application No. PCT/KR2019/011849 filed Sep. 11, 2019, which claims priority to Korean Patent Application No. 10-2018-0114970 filed Sep. 27, 2018, and Korean Patent Application No. 10-2019-0027954 filed Mar. 12, 2019, the disclosures of which are herein incorporated by reference in their entirety.

BACKGROUND

1. Field

The disclosure relates to a method and device for a terminal to indicate whether listen-before-talk (LBT) fails and declare a detected LBT failure, in reporting mechanisms, such as a radio link failure (RLF), a second cell group (SCG) failure, an establishment failure, and minimization of drive tests (MDT).

2. Description of Related Art

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System". The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access(NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

In a next-generation mobile communication system, an NR-U technology capable of providing a data communication service by using only an unlicensed frequency band is being developed. The unlicensed frequency band is already used by other wireless communication systems, such as Wi-Fi, and a communication service provider may be shared with other next-generation mobile communication systems. LBT procedures are required to efficiently share and use the unlicensed frequency band between other wireless communication systems or between next-generation mobile communication systems operated by different operators.

SUMMARY

An aspect of the disclosure is to provide a method for solving a problem that may occur in a case where there is a terminal performing a Logged MDT operation in a standby mode or an inactive mode within a service area of a base station when the base station fails to broadcast a synchronization signal block (SSB) due to an LBT failure.

Another aspect of the disclosure is to propose a procedure in which a terminal indicates whether LBT has failed, and declares a detected LBT failure, in reporting mechanisms, such as an RLF, an SCG failure, an establishment failure, and MDT.

The disclosure for solving such problems relates to a method performed by a terminal in a wireless communication system, the method including: performing listen-before-talk (LBT) for uplink transmission; detecting an LBT failure while performing the LBT; and if the number of detected LBT failures is equal to or more than a preconfigured number, determining a radio link failure (RLF).

In some embodiments, the method further includes transmitting an RLF report including information indicating that a cause of the RLF is the LBT failure.

In some embodiments, the preconfigured number is configured in advance by the terminal or may be configured based on information received from a base station.

In some embodiments, the determining of the RLF includes: operating a predetermined timer when the number of detected LBT failures is equal to or more than the preconfigured number; and if the predetermined timer expires, determining the RLF.

In some embodiments, the method further includes: transmitting a first radio resource control (RRC) message to a base station; receiving a second RRC message from the base station in response to the first RRC message; transmitting a third RRC message including an indicator indicating RLF-related information to the base station; receiving a message for requesting an RLF report, from the base station; and if the terminal detects the LBT failure in a second cell group (SCG), determining an SCG failure.

In other embodiments, a terminal in a wireless communication system includes: a transceiver; and a controller connected to the transceiver, wherein the controller is configured to: perform listen-before-talk (LBT) for uplink transmission; detect an LBT failure while performing the LBT; and if the number of detected LBT failures is equal to or more than a preconfigured number, determine a radio link failure (RLF).

In other embodiments, a method performed by a base station in a wireless communication system includes: receiving a first radio resource control (RRC) message including an indicator indicating radio link failure (RLF)-related information from a terminal; transmitting a message for requesting an RLF report, to the terminal; and receiving, from the terminal, the RLF report including information indicating that a cause of the RLF is a listen-before-talk (LBT) failure, wherein, if the number of detected LBT failures is equal to or more than a preconfigured number, the RLF due to the LBT failure is determined.

In other embodiments, a base station in a wireless communication system includes: a transceiver; and a controller connected to the transceiver, wherein the controller is configured to: receive a first radio resource control (RRC) message including an indicator indicating radio link failure (RLF)-related information from a terminal; transmit a message for requesting an RLF report, to the terminal; and receive, from the terminal, the RLF report including information indicating that a cause of the RLF is a listen-before-talk (LBT) failure, wherein, if the number of detected LBT failures is equal to or more than a preconfigured number, the RLF due to the LBT failure is determined.

According to an embodiment of the disclosure, by proposing a base station to report, to a TCE server, that an SSB has not been broadcast in a specific time period due to an LBT failure, a mobile communication service provider that has collected information from the terminal can discriminate whether an area, in which logging is not performed, is a shadow area or whether the SSB has not been broadcast.

According to another embodiment of the disclosure, a base station can distinguish whether an LBT failure occurs due to a poor channel quality or a failure in a contention procedure.

DETAILED DESCRIPTION

Figure 1A:
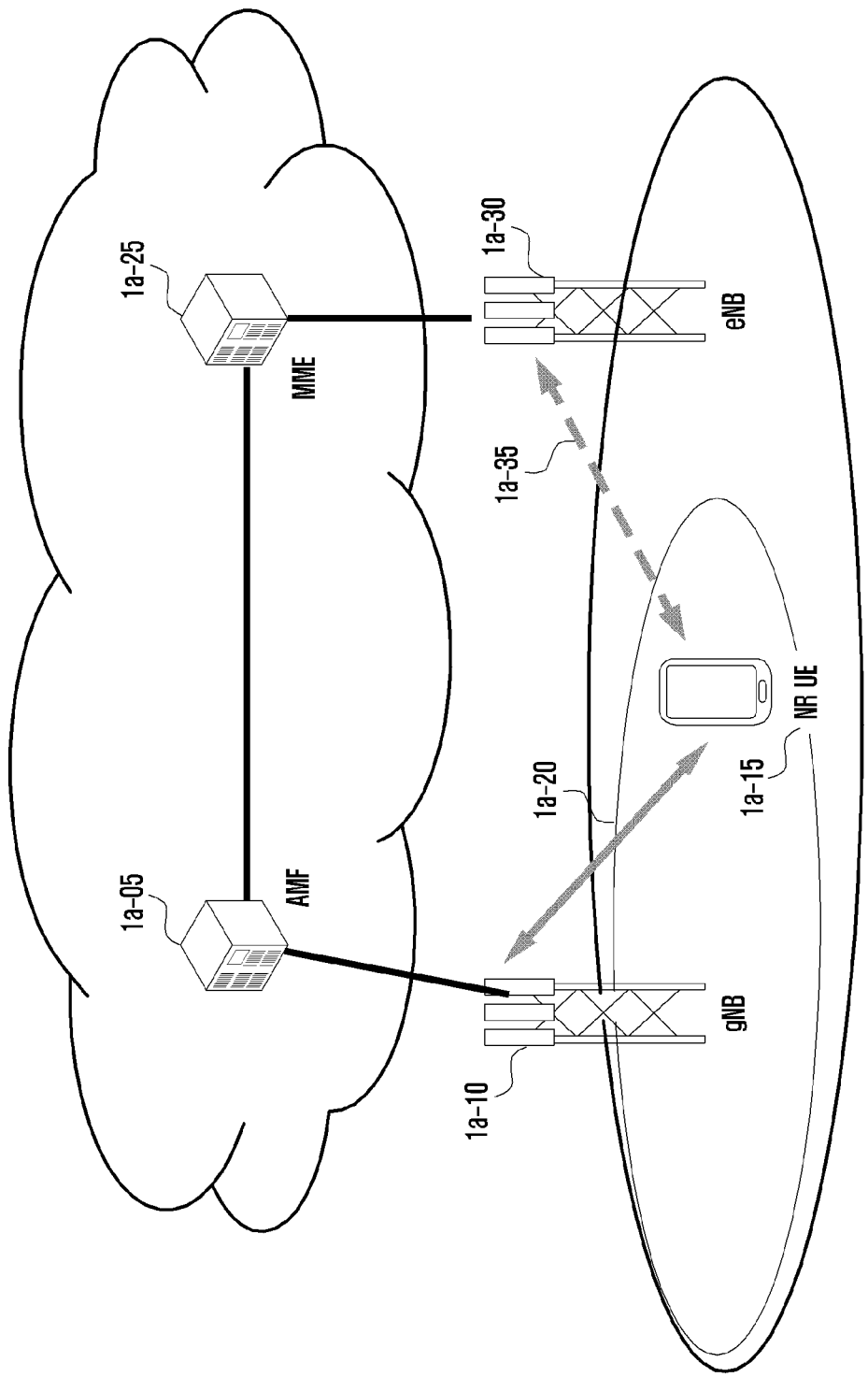
FIG. 1A is a diagram illustrating a structure of a next-generation mobile communication system.

Hereinafter, embodiments of the disclosure will be described in detail in conjunction with the accompanying drawings. In the following description of the disclosure, a detailed description of known functions or configurations incorporated herein will be omitted when it may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

First Embodiment

In the following description of the disclosure, if it is determined that a detailed description of a related disclosed function or configuration unnecessarily obscures a subject matter of the disclosure, the detailed description thereof will be omitted. Hereinafter, embodiments of the disclosure will be described with reference to the accompanying drawings.

FIG. 1A is a diagram illustrating a structure of a next generation mobile communication system.

Referring to FIG. 1A, as illustrated, a radio access network of the next-generation mobile communication system (new radio, NR) includes a next-generation base station (new radio node B, hereinafter, gNB) 1a-10 and an access management function (AMF) (new radio core network) 1a-05. A user terminal (new radio user equipment, hereinafter, NR UE or terminal) 1a-15 accesses an external network via the gNB 1a-10 and the AMF 1a-05.

In FIG. 1A, the gNB corresponds to an evolved node B (eNB) of a conventional LTE system. The gNB is connected to the NR UE via a radio channel, and may provide a service superior to that of an existing Node B, in 1a-20. In the next-generation mobile communication system, all user traffics are serviced through a shared channel, and therefore a device, which collects state information, such as buffer states, available transmission power states, and channel states of UEs, to perform scheduling, is required, and the gNB 1a-10 takes charge of collecting the state information to perform scheduling.

A single gNB typically controls a plurality of cells. In order to implement high-speed data transmission compared to the conventional LTE, a single gNB may have an existing maximum bandwidth or wider, and orthogonal frequency division multiplexing (hereinafter, referred to as OFDM) may be used as a radio access technology to further combine a beamforming technology. Further, an adaptive modulation & coding (hereinafter, referred to as AMC) scheme that determines a modulation scheme and a channel coding rate according to a channel state of a terminal is applied.

The AMF 1a-05 performs a function, such as mobility support, bearer configuration, and quality of service (QoS) configuration. The AMF is a device that is in charge of various control functions as well as a mobility management function for the terminal, and is connected to a plurality of base stations. Further, the next-generation mobile communication system may also be linked to the conventional LTE system, and the AMF is connected to a mobility management entity (MME) 1a-25 via a network interface. The MME is connected to an eNB 1a-30 that is an existing base station. A terminal supporting LTE-NR dual connectivity may transmit or receive data while maintaining a connection to an eNB as well as the gNB, in 1a-35.

Figure 1B:
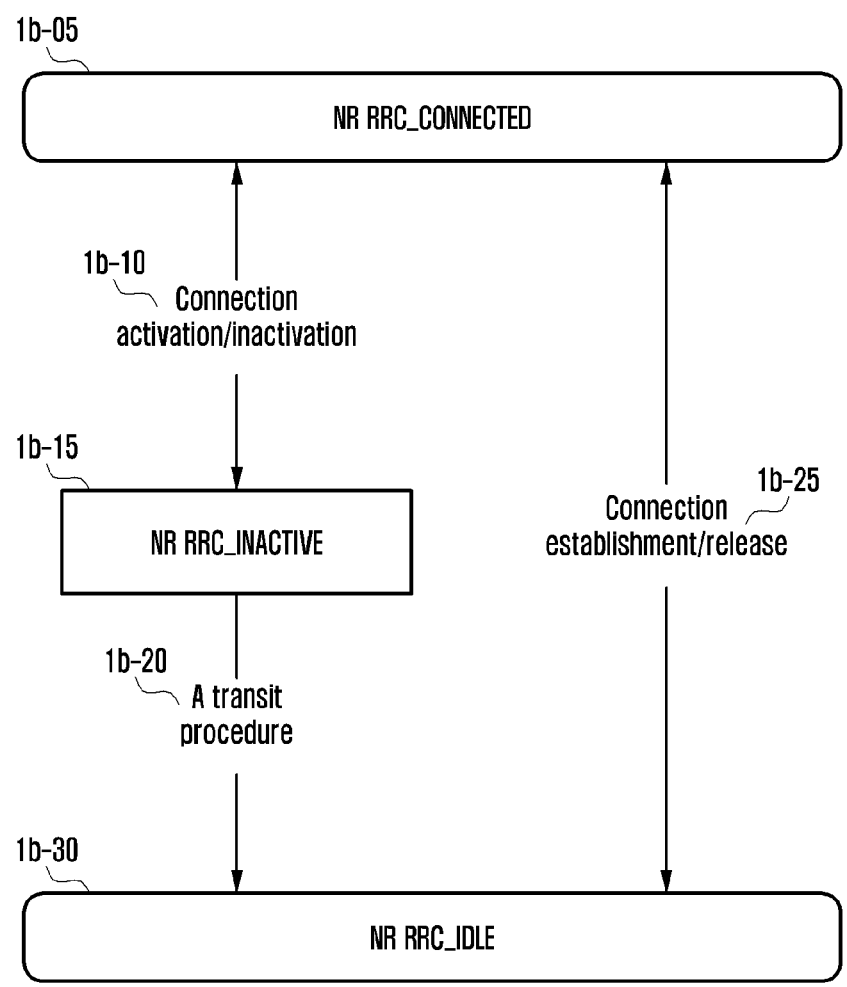
FIG. 1B is a diagram for describing a transition of a radio connection state in the next-generation mobile communication system.

FIG. 1B is a diagram for describing a transition of a wireless connection state in the next-generation mobile communication system.

The next-generation mobile communication system has three radio access states (RRC states). A connected mode (RRC_CONNECTED) 1b-05 is a radio access state in which a terminal is able to transmit or receive data. A standby mode (RRC_IDLE) 1b-30 is a radio access state in which the terminal monitors whether paging is transmitted to itself. The two modes are radio access states applied to the conventional LTE system, and detailed techniques are the same as those of the conventional LTE system.

In the next-generation mobile communication system, an inactive (RRC_INACTIVE) radio access state 1b-15 has been newly defined. In the radio access state, a UE context is maintained in a base station and the terminal, and RAN-based paging is supported. Characteristics of the new radio access state are as follows.

Cell re-selection mobility;
CN-NR RAN connection (both C/U-planes) has been established for UE;
The UE AS context is stored in at least one gNB and the UE;
Paging is initiated by NR RAN;
RAN-based notification area is managed by NR RAN;
NR RAN knows the RAN-based notification area which the UE belongs to;

The new INACTIVE radio access state may be transitioned to the connected mode or the standby mode by using a specific procedure. Depending on connection activation, an INACTIVE mode is switched to the connected mode, and the connected mode is switched to the INACTIVE mode by using a connection inactivation procedure, in 1b-10. In the connection activation/inactivation procedure, one or more RRC messages are transmitted or received between the terminal and the base station, and includes one or more operations. Also, it is possible to switch from the INACTIVE mode to the standby mode according to a specific procedure, in 1b-20. For the above-mentioned specific procedure, various methods, such as an exchange of a specific message, a timer-based method, or an event-based method, may be considered. Switching between the connected mode and the standby mode follows the conventional LTE technology. That is, based on a connection establishment or release procedure, switching between the modes is made, in 1b-25.

Figure 1C:
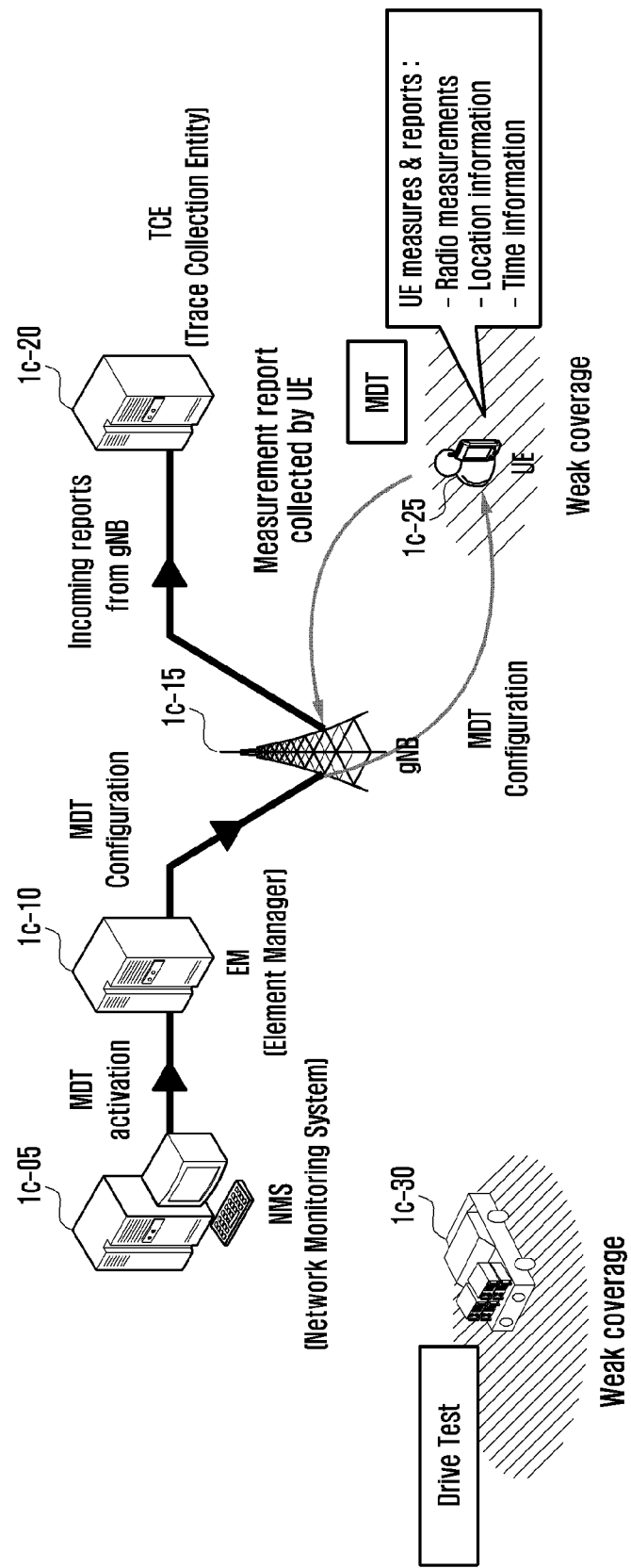
FIG. 1C is a diagram illustrating a technology for collecting and reporting cell measurement information in the disclosure.

FIG. 1C is a diagram illustrating a technology for collecting and reporting cell measurement information in the disclosure.

When a network is built or optimized, a mobile communication service provider usually measures a signal strength in an expected service area, and based on this, a procedure of arranging or re-adjusting base stations in the service area is performed. The service provider loads signal measurement equipment on a vehicle and collects cell measurement information in the service area, which requires a lot of time and cost. Such a process generally utilizes a vehicle and is commonly referred to as a drive test. A terminal is equipped with a function capable of measuring a signal to a base station, in order to support operations, such as cell reselection, handover, or serving cell addition, during movement between cells. Therefore, instead of the drive test, a terminal in the service area may be used, and this is referred to as minimization of drive test (MDT).

The service provider may configure MDT operations to specific terminals via various elements of a network, and the terminals collect and store signal strength information from a serving cell and neighboring cells in a connected mode (RRC_Connected), a standby mode (RRC_Idle), or an inactive mode (RRC_Inactive). In addition, a variety of information, such as location information, time information, and signal quality information, is also stored. The stored information may be reported to the network when the terminals are in the connected mode, and the information is transferred to a specific server.

The MDT operations are largely classified into Immediate MDT and Logged MDT.

In Immediate MDT, collected information is reported to the network immediately. Since the collected information should be reported immediately, only a terminal in the connected mode may perform the Immediate MDT. In general, a radio resource management (RRM) measurement procedure to support operations, such as handover and serving cell addition, is reused, and location information, time information, and the like are additionally reported.

In Logged MDT, the collected information is stored without immediately reporting the same to the network and, thereafter, the terminal switches a mode to the connected mode and then reports the stored information. Typically, a terminal in the standby mode, in which the collected information cannot be immediately reported to the network, performs Logged MDT. In the disclosure, a terminal in the inactive mode introduced in the next-generation mobile communication system performs Logged MDT. When a specific terminal is in the connected mode, the network provides configuration information for performing a Logged MDT operation to the terminal, and the terminal switches a mode to the standby mode or the inactive mode and then collects and stores the configured information.

TABLE 1

| | RRC state |
|---|---|
| Immediate MDT | RRC_Connected |
| Logged MDT | RRC_Idle, RRC_Inactive |

Figure 1D:
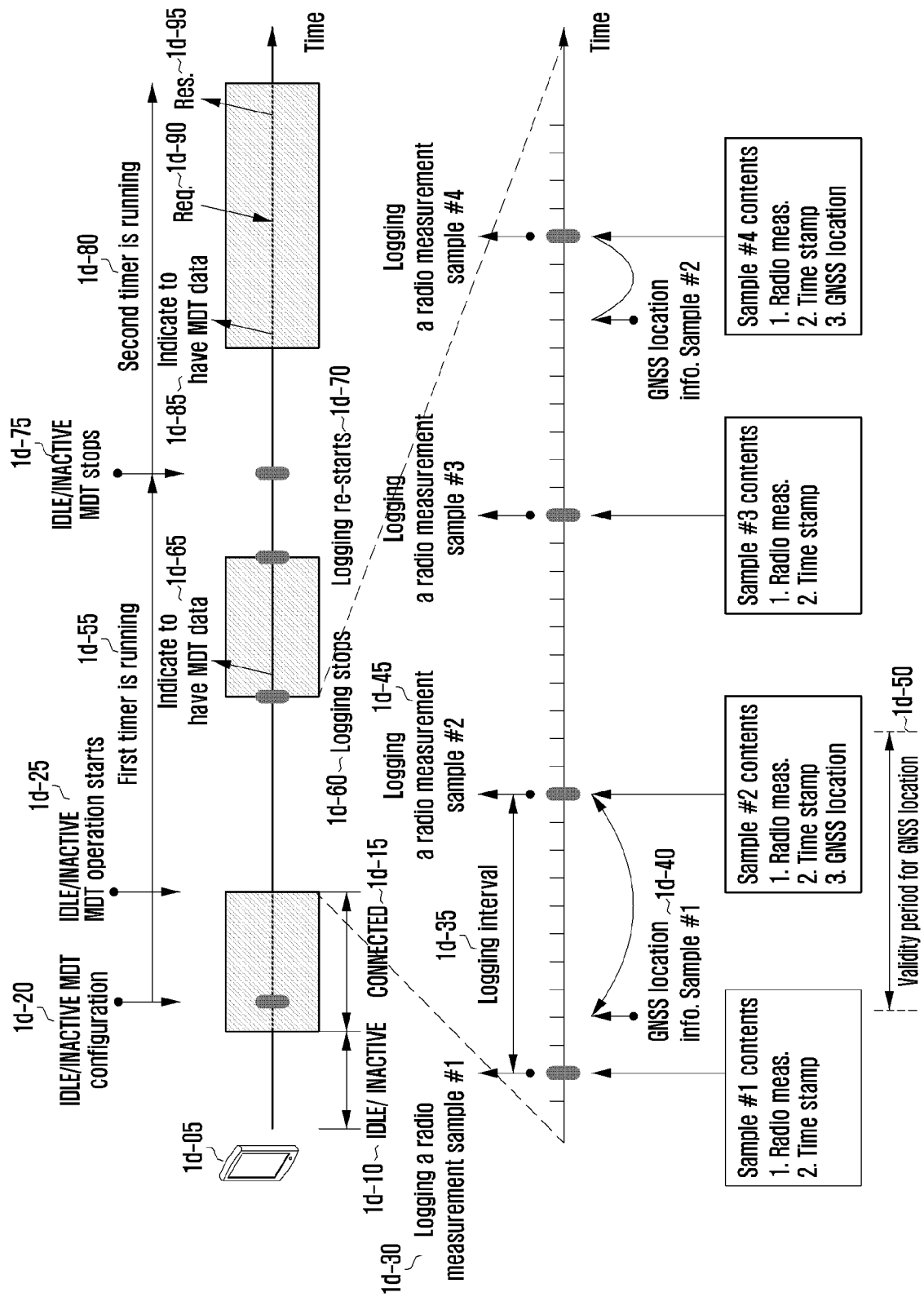
FIG. 1D is a diagram illustrating a method for collecting and reporting cell measurement information in the disclosure.

FIG. 1D is a diagram illustrating a method for collecting and reporting cell measurement information in the disclosure. A terminal 1d-05 switches a standby mode or an inactive mode 1d-10 to a connected mode 1d-15. In the connected mode, MDT data is collected and reported to a base station via an Immediate MDT operation. The terminal switched to the connected mode receives, from the base station, Logged MDT configuration information performed in the standby mode or inactive mode, in 1d-20. The configuration information is included in a predetermined RRC message so as to be transmitted to the terminal, and the terminal having received the message operates a first timer, in 1d-55. The terminal performs a Logged MDT operation in a standby mode or inactive mode period, until the first timer expires. A value of the first timer is included in the Logged MDT configuration information.

When the terminal switches the mode to the standby mode or inactive mode, Logged MDT is performed according to the received configuration information, in 1d-25. The terminal stores predetermined information collected in each configured interval, i.e., a logging interval 1d-35, in 1d-30 and 1d-45. If valid location information 1d-40 is collected, the collected predetermined information should also be stored. Whether the location information is valid is determined to be valid if a predetermined time 1d-50 has not passed after the information is collected. The predetermined time is shorter than or equal to the logged interval.

While moving, the terminal may enter a service shadow area (coverage hole) to which a transmission/reception signal from a base station is unable to reach. In this case, the terminal continues the logging operation for a predetermined time, but suspends the logging operation after the predetermined time lapses. In other words, the terminal performs the logging operation only in a camped normal state. Even if S-criterion is not satisfied, the terminal maintains the camped normally state for a predetermined time (10 s for EUTRA and 12 s for UTRA), and after the time lapses, the state is switched to an any cell selection state. At this time, the terminal suspends the logging operation. When the terminal leaves the coverage hole, the logging operation is resumed. Accordingly, the mobile communication service provider may determine a period without logging information, as a coverage hole.

Even before the first timer expires, the terminal temporarily suspends the Logged MDT operation which has been performed, when switching to the connected mode, in 1d-60. However, the first timer is continuously operated without suspending even in a connection mode period. That is, the first timer continues to be operated irrespective of a change of an RRC state. However, when a terminal memory for storing MDT data is insufficient and thus no more storage is available, or when the Logged MDT configuration information is released, the first timer is suspended. A case where the Logged MDT configuration information is released corresponds to a case where other Logged MDT configuration information is provided in a serving radio access technology (RAT) or another RAT, or a case where the terminal is detached or is power off. During a connection establishment procedure (RRC connection establishment) or a connection resuming procedure (RRC connection resume), the terminal reports an indication of having collected information (MDT data) stored therein to the base station, by using the predetermined RRC message, in 1d-65. The connection resuming procedure is a procedure of switching the inactive mode to the connected mode by the terminal. The connection resuming procedure generally includes a procedure with three operations, and three types of RRC messages are used.

operation 1: The terminal transmits an RRC Resume Request message to the base station.
    operation 2: The base station transmits an RRC Resume message to the terminal.
    operation 3: The terminal transmits an RRC Resume Complete message to the base station.

Depending on the purpose of Resume, the connection resuming procedure may include two operations. For example, a Resume procedure for RNA update may include:
    operation 1: The terminal transmits an RRC Resume Request message to the base station.
    operation 2: The base station transmits an RRC Resume message to the terminal.

Detailed descriptions will be provided later.

The terminal reports information indicating to have the collected information to a target base station even during a connection re-establishment procedure (RRC Connection Reestablishment) and a handover procedure, in addition to the connection establishment procedure or the connection resuming procedure. If the Logged MDT has been configured, but there is no information collected and stored yet, the report is omitted.

The base station having received the report may request, when necessary, a report of MDT data stored in the terminal. The terminal should continuously store unreported MDT data for a predetermined time. If the terminal is switched to the standby mode or the inactive mode again, and the first timer has not yet expired, the Logged MDT operation is resumed in 1d-70. If the first timer expires, the Logged MDT operation is suspended in 1d-75. The terminal having suspended the operation operates a second timer in 1d-80, and maintains the stored MDT data until the timer expires. After the timer expires, whether to delete the stored MDT data is determined by implementation of the terminal. A value of the second timer is neither included in the Logged MDT configuration information nor configured, and a predefined value is applied.

When the terminal is switched to the connected mode again, the terminal reports the indication of having the collected information (MDT data) stored therein to the base station, in 1d-85. The base station requests the report of MDT data stored in the terminal, by using the predetermined RRC message, in 1d-90. Accordingly, the terminal receives the MDT data stored in the predetermined RRC message, and reports the message to the base station, in 1d-95.

In the next-generation mobile communication system, an NR-U technology capable of providing a data communication service by using only an unlicensed frequency band is being developed. The unlicensed frequency band is already used by other wireless communication systems, such as Wi-Fi, and a communication service provider may be shared with other next-generation mobile communication systems. In order to efficiently share and use the unlicensed frequency band between other wireless communication systems or between next-generation mobile communication systems operated by different service providers, a Listen-Before-Talk (LBT) procedure is required.

The LBT procedure is a procedure of, before using the unlicensed frequency band, determining whether another user is using the unlicensed frequency band, and obtaining an opportunity to use the frequency band, via contention. Therefore, an opportunity to transmit or receive data, as in a licensed frequency band, is not always guaranteed. In the disclosure, an LBT failure refers to a failure finally having occurred in obtaining a data transmission/reception opportunity for a specific time period, due to failing to be selected in contention or due to another system or terminal having already occupied a radio channel, via the LBT procedure. The LBT operation may be performed in both the base station and the terminal. For example, the base station performs the LBT operation to perform downlink data transmission. An opportunity for a synchronization signal block (SSB), which is broadcast by the base station and is used for the terminal to measure a downlink quality, to be broadcast first via the LBT procedure should be obtained. If LBT fails, the base station is unable to broadcast the SSB for a specific time.

When the base station is unable to broadcast the SSB due to the LBT failure, there may be a terminal performing a logged MDT operation in the standby mode or inactive mode within a service area of the base station. The terminal is not receiving the SSB from the base station, and thus considers that the terminal has entered the coverage hole and may suspend a logging operation. If the base station broadcasts the SSB again, it may be determined that the terminal is out of the coverage hole and the terminal may resume the logging operation.

There is a problem that the collected information is transferred to a TCE server, and the mobile communication service provider analyzing the same is unable to distinguish whether the area, in which the logging is not performed, is a coverage hole or whether the SSB has not been broadcast. The purpose of MDT is to collect information necessary for the mobile communication service provider to optimize a service area thereof. Incapability of distinguishing between the above cases does not satisfy the purpose of MDT. Therefore, the disclosure proposes a method to solve the problem.

Figure 1E:
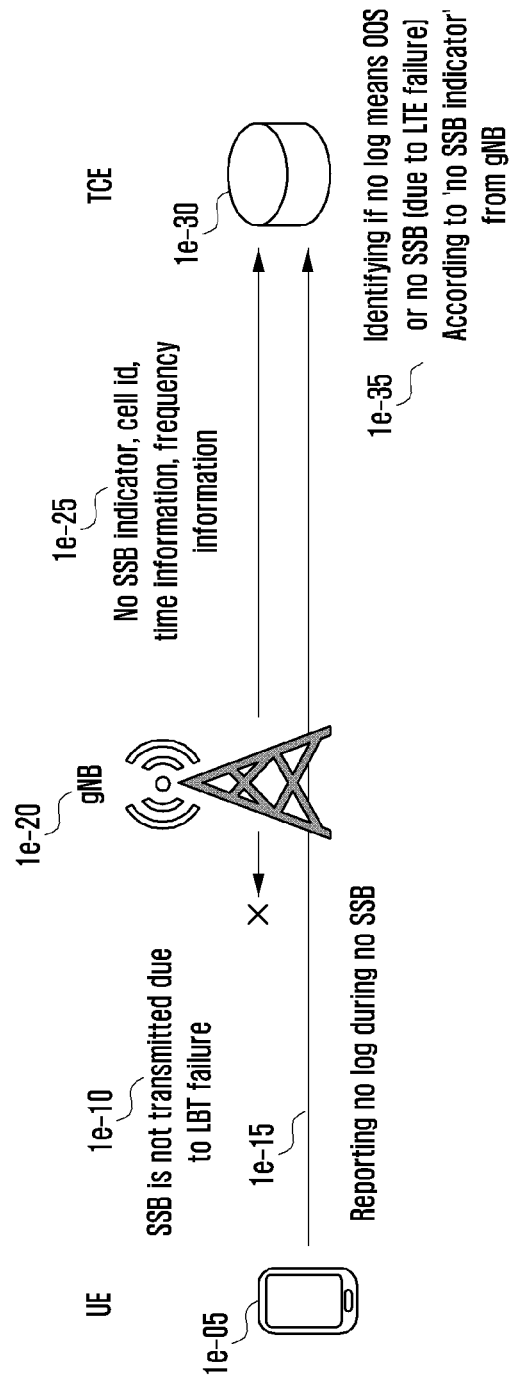
FIG. 1E is a diagram for describing a method for distinguishing between a service shadow area and an SSB transmission failure due to an LBT failure in the disclosure.

FIG. 1E is a diagram for describing a method for distinguishing between a service shadow area and an SSB transmission failure due to an LBT failure in the disclosure.

A base station 1e-20 is unable to broadcast an SSB for a specific time period due to an LBT failure, in 1e-10. A terminal 1e-05 that is performing a logging operation is unable to receive the SSB, and is unable to distinguish between receiving no SSB and a coverage hole. The terminal suspends the logging operation in a period in which no SSB can be received. If the base station broadcasts the SSB again, the terminal resumes the suspended logging operation. MDT data collected by the terminal is transmitted to a TCE server via the base station. In the disclosure, in order to determine, on the basis of the information collected by the TCE server, whether a period in which no logging information is present is a coverage hole, or no SSB has been transmitted due to the LBT failure, the base station reports, to the TCE server, that no SSB has been broadcast in the specific time period due to the LBT failure. The information reported by the base station to the TCE server is as follows.

Cell ID

Information of a time period in which no SSB has been broadcast due to an LBT failure Information of a frequency at which no SSB has been broadcast due to an LBT failure Indicator indicating that no SSB has been broadcast due to an LBT failure A plurality of base stations may need to report information to the TCE server, and therefore cell ID information should be included to distinguish the plurality of base stations. For example, the cell ID information may be CGI information, PCI information, and the like.

Information of the time period, in which no SSB has been broadcast due to the LBT failure, is to be compared with the time period with no logging information in the information reported by the terminal. The information of the time period in which no SSB has been broadcast is absolute time information.

If the terminal has no logging information in the same or similar time zone, and if it is determined that no SSB has been transmitted, the TCE server having received information from the terminal and the base station determines that the absence of the logging information is due to an LBT failure in the time zone. On the other hand, if the terminal has no logging information in the same or similar time zone, and if it is determined that the SSB has been transmitted, the TCE server determines that the logging information is absent because the terminal has been in a coverage hole in the time zone.

The information of the frequency at which no SSB has been broadcast due to the LBT failure allows a mobile communication service provider to determine a frequency at which an LBT failure occurs frequently according to statistics.

An indicator indicating that no SSB has been broadcast due to the LBT failure may be included, and the indication may be implicitly performed only by reporting the information.

Figure 1F:
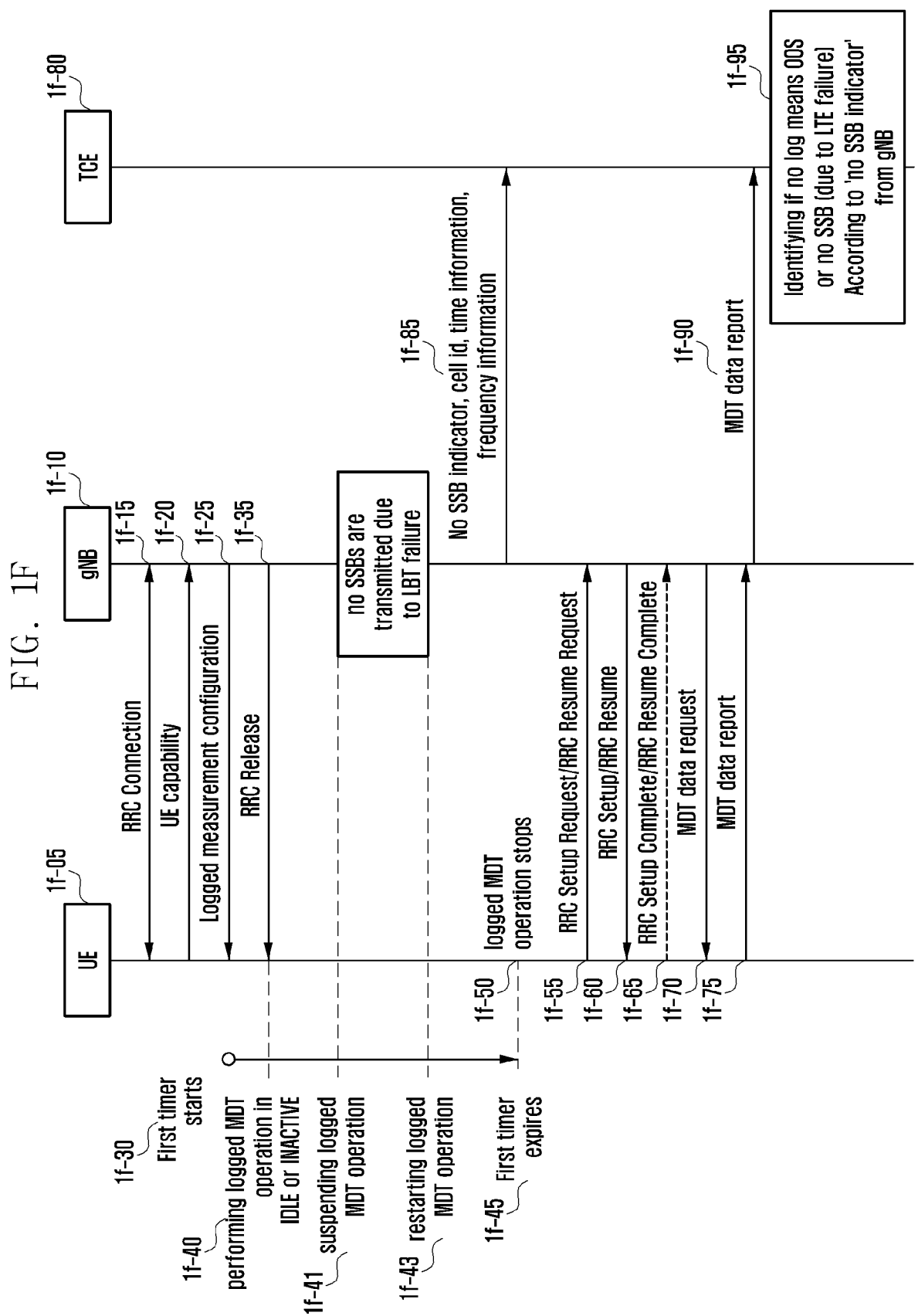
FIG. 1F is a flowchart of an operation of collecting and reporting cell measurement information in the disclosure.

FIG. 1F is a flowchart of an operation of collecting and reporting cell measurement information in the disclosure.

A terminal 1f-05 establishes a connection with a base station 1f-10, in 1f-15. The base station is operating in an unlicensed frequency band. The terminal provides terminal capability information to the base station in 1f-20, and may indicate whether the terminal itself supports an MDT operation and may indicate a frequency that the terminal is able to measure. The base station includes, in a predetermined RRC message, configuration information necessary for performing a Logged MDT operation, and transmits the RRC message to the terminal in 1f-25. For example, the configuration information includes at least one of the following information.

Trace Reference Information

Trace Recording Session Reference Information

Trace Collection Entity (TCE) ID Information: The base station transmits MDT data information, which has been reported from the terminal, to a data server designated by a TCE ID.

Absolute Time Information: An absolute time in a current cell that provides Logged MDT configuration information Area Configuration: Area information indicated in units of cells, in which measurement information may be collected and stored via the Logged MDT operation. Radio access technology (RAT) information, for which measurement information should be collected, may be included. A list included in the RAT information is a black list or a white list. If the list is a black list, cell measurement information is collected for an RAT that is not included in the list. If the list is a white list, cell measurement information is not collected for the RAT that is not included in the list.

Logging Duration: A value of the first timer. When the timer is operating, the Logged MDT operation is performed in a standby mode or an inactive mode.

Logging Interval: An interval of storing collected information plmn-IdentityList: Public land mobile network (PLMN) list information. Not only performing of the Logged MDT operation, but also PLMN information, which enables reporting of MDT data and reporting of whether MDT data is stored, are included.

Indicator indicating whether the Logged MDT operation is performed in the standby mode, inactive mode, or both. The indicator may indicate an RRC state in which the Logged MDT operation is performed, or it may be defined that the Logged MDT operation is always performed in the standby mode and inactive mode without the indicator. The UE performs the Logged MDT operation only in the RRC state indicated by the indicator.

Indicator indicating whether to collect and store beam level measurement information. In the next-generation mobile communication system, a beam antenna may be applied. Without the indicator, for a frequency at which a beam-based operation is performed, it may be defined that beam level measurement is always collected and stored.

Information on the maximum number of beams, which is to be collected or stored, and information on the minimum signal strength of a beam, which is to be stored. The terminal skips storing information on a beam, the signal strength of which is weaker than the minimum signal strength. If all beams have values weaker than the configured minimum signal value, the terminal may store information of one beam having a strongest signal strength from among all the beams, or may include an indicator indicating that all the beams have values weaker than the configured minimum signal value.

Indicator indicating whether an MDT retrieval operation can be triggered in an operation 2 resuming procedure (RRC Resume).

The terminal having received the Logged MDT configuration information operates the first timer, in 1*f*-30. A value of the first timer is configured to be equal to a value of the Logging Duration. The base station switches a mode of the terminal to the standby mode or the inactive mode by using an RRC Release message, in 1*f*-35. Depending on an RRC state, to which switching is performed, configuration information for an operation in the RRC state is included in the RRC Release message. If the first timer is being operated, the terminal performs Logged MDT in the standby mode or the inactive mode, in 1*f*-40.

The terminal measures signal strengths of a serving cell and neighboring cells, and obtains location information. If beam level measurement is configured, the terminal collects and stores a signal strength value for a beam having a value greater than the configured minimum value in the serving cell and the neighboring cell. Here, the maximum number of beams which can be stored is configured or predefined. The signal strength refers to a reference signal received power (RSRP), a reference signal received quality (RSRQ), or a signal-to-noise and interference ratio (SINR). The terminal stores the collected information in each Logged Interval period. Each piece of log information stored in each period includes an indicator indicating whether the stored information has been collected in the standby mode or has been collected in the inactive mode. Alternatively, the indicator may be included in each first log in which a mode is switched. This may minimize a signaling overhead due to the indicator.

The base station may not be able to broadcast an SSB due to an LBT failure. The terminal is unable to receive an SSB that satisfies a particular signal strength, and the logging operation is thus suspended, in 1*f*-41. If the base station succeeds in LBT and broadcasts the SSB again, the terminal performs the logging operation again, in 1*f*-43. If the first timer expires in 1*f*-45, the terminal suspends the Logged MDT operation in 1*f*-50.

The base station reports, to the TCE server 1*f*-80, that broadcasting of the SSB has failed due to the LBT failure, in 1*f*-85. The reporting may be performed periodically, and even if a report period arrives, if there occurs no failure in SSB transmission due to the LBT failure, an actual report may be omitted, or only an indicator indicating that no SSB transmission failure has occurred may be reported to the TCE server. The periodic reporting may cause a signaling overhead between the base station and the TCE server, and therefore the base station may report, to the TCE server, an SSB transmission failure within a predetermined time only when an actual SSB transmission failure has occurred, or the base station may report the information along with MDT data collected by a specific terminal when forwarding the MDT data to the TCE server.

If the terminal is in the inactive mode by the RRC Release message and receives RAN or CN paging from the base station, or MO data transmission is activated, the terminal initiates a resume procedure for switching from the inactive mode to the connected mode. In the disclosure, the terminal includes, in an RRC Resume Request or an RRC Resume Complete message, a first indicator indicating whether there is MDT data stored by the terminal itself. For example, when the resume procedure is triggered for the purpose of RNA update and is in operation 2, the first indicator is included in the RRC Resume Request message. Otherwise, if the purpose of the Resume procedure is to switch to the connected mode for data transmission, the procedure includes three operations, and the first indicator is included in the RRC Resume Complete message.

In response to the RRC Resume Request message, the base station transmits the RRC Resume message to the terminal. If the RRC Resume Request message includes the first indicator in 1*f*-55, and if the base station desires to receive a report for the MDT data, the base station includes, in the RRC Resume message, an indicator for requesting the report for the MDT data in 1*f*-60, or if the RRC Resume message is for resuming of operation 2, the base station includes an indicator indicating the terminal to switch a mode to the connected mode. Further, configuration information necessary for switching to the connected mode is included in the RRC Resume message. The terminal having received the indicator performs a switch to an operation 3 Resume procedure even if the RRC Resume Request message is triggered for an operation 2 Resume procedure, in order to switch the mode to the connected mode. In the operation 3 Resume procedure, the first indicator is included in the RRC Resume Complete message, in 1*f*-65. After receiving the RRC Resume Complete message, the base station requests the terminal to report the MDT data by using the predetermined RRC message, in 1*f*-70. Accordingly, the terminal reports the stored MDT data to the base station by using the predetermined RRC message, in 1*f*-75.

If the terminal is in the standby mode by the RRC Release message and receives CN paging from the base station, or MO data transmission is activated, the terminal initiates an establishment procedure for switching from the standby mode to the connected mode. The establishment procedure includes:
- operation 1: The terminal transmits an RRC Setup Request message to the base station.
- operation 2: The base station transmits an RRC Setup message to the terminal.
- operation 3: The terminal transmits an RRC Setup Complete message to the base station.

The terminal includes, in the RRC Setup Complete message, an indicator indicating that there is MDT data stored therein. When necessary, the base station having received the RRC Setup Complete message requests reporting of the MDT data by using a predetermined RRC message. The terminal having received the request reports the MDT data by using the predetermined RRC message.

The base station having received the MDT data forwards the MDT data to the TCE server, in 1*f*-90. Based on the information reported to the terminal and the base station, the TCE server determines whether a coverage hole has been generated at a specific time and in a specific area, or whether an SSB transmission failure due to an LBT failure has occurred. If the terminal has no logging information in the same or similar time zone, and if it is determined that no SSB has been transmitted, the TCE server determines that the absence of the logging information is due to an LBT failure in the time zone. On the other hand, if the terminal has no logging information in the same or similar time zone, and if it is determined that the SSB has been transmitted, the TCE server determines that the logging information is absent because the terminal has been in a coverage hole in the time zone.

Figure 1G:
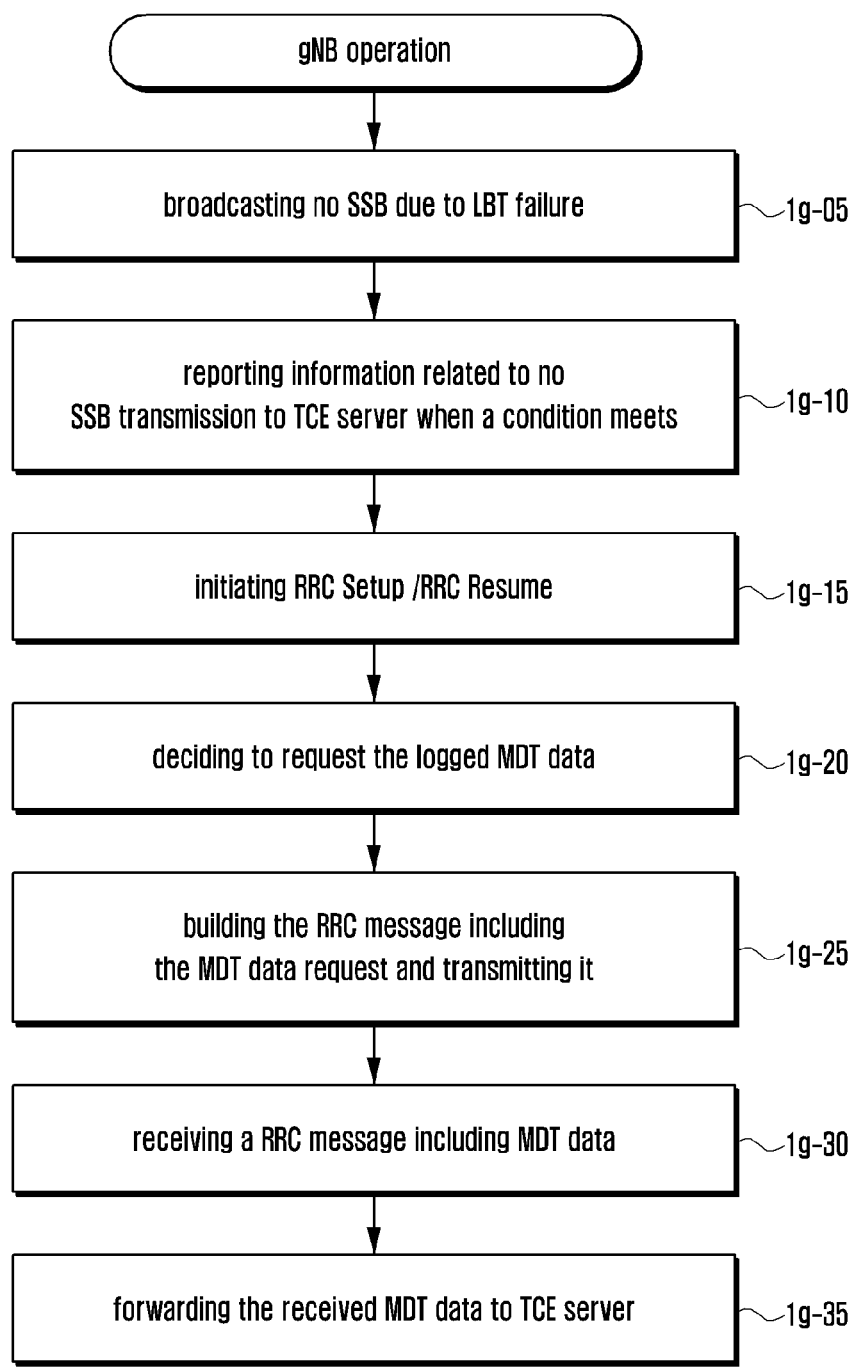
FIG. 1G is a flowchart of operations of a base station in the disclosure.

FIG. 1G is a flowchart of operations of a base station in the disclosure.

In operation 1*g*-05, a base station is unable to broadcast an SSB due to an LBT failure.

In operation 1*g*-10, the base station reports, to a TCE server, an SSB transmission failure due to the LBT failure. In particular, the base station reports cell ID information, information of a time and frequency at which the SSB transmission has failed, and the like. There are various options for a reporting time.
- Immediate reporting an SSB transmission failure when the failure has occurred due to an LBT failure
- Reporting an SSB transmission failure due to an LBT failure that has occurred periodically. If there is no SSB transmission failure due to the LBT failure for only one period, reporting can be omitted.
- When MDT data of a specific terminal is transferred to the TCE server, reporting an SSB transmission failure due to an LBT failure having occurred up to that point.

If the TCE server successfully reports the SSB transmission failure due to the LBT failure, the base station may be allowed to delete related information that has been reported.

In operation 1*g*-15, the base station performs an RRC Setup (RRC establishment) or RRC Resume procedure from a specific terminal that has configured MDT. During the RRC Setup or RRC Resume procedure, the base station receives, from the terminal, an RRC message including an indicator indicating that the terminal stores MDT data.

In operation 1*g*-20, the base station determines to request the MDT data stored in the terminal.

In operation 1*g*-25, the base station transmits, to the terminal, a predetermined RRC message including an indicator indicating the request.

In operation 1*g*-30, the base station receives, from the terminal, a predetermined RRC message including the requested MDT data.

In operation 1*g*-35, the base station forwards the collected MDT data to the TCE server.

Figure 1H:
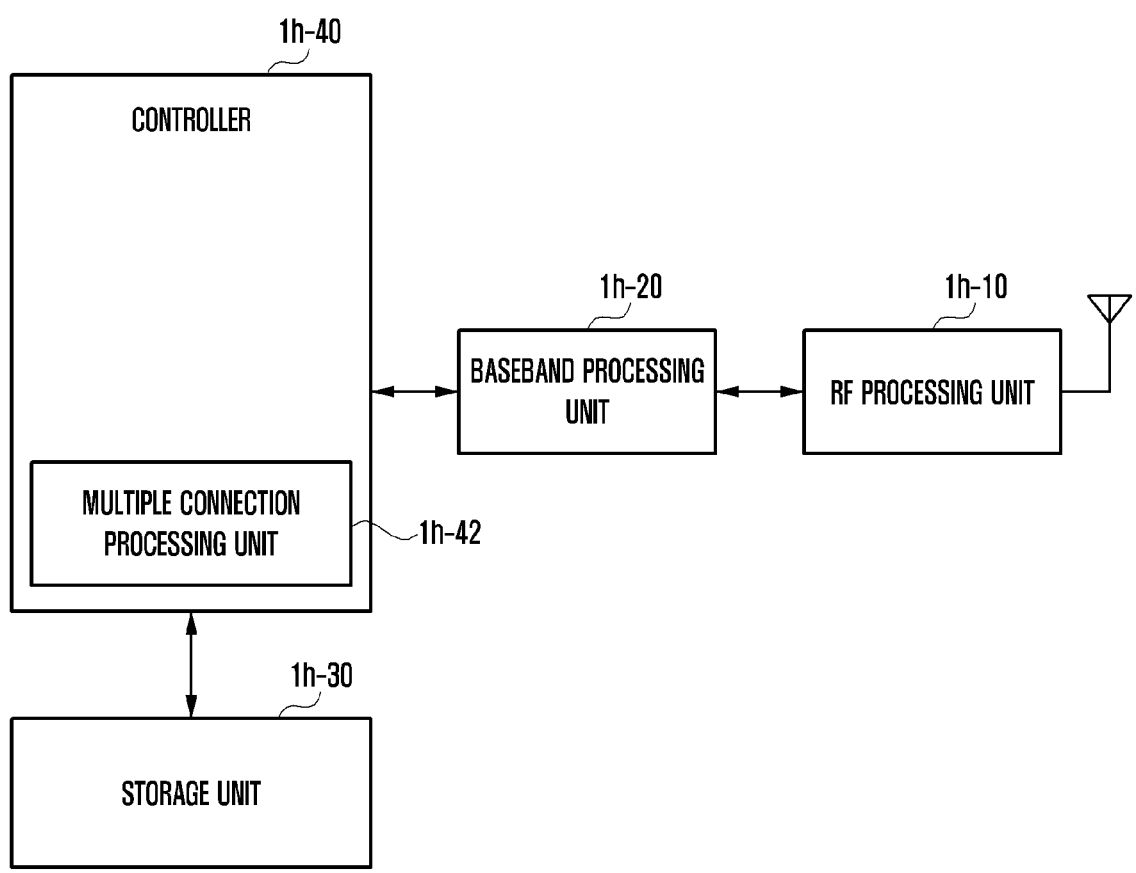
FIG. 1H is a block diagram illustrating an internal structure of a terminal, to which the disclosure has been applied.

FIG. 1H illustrates a structure of a terminal.

Referring to FIG. 1H, the terminal includes a radio frequency (RF) processing unit 1*h*-10, a baseband processing unit 1*h*-20, a storage unit 1*h*-30, and a controller 1*h*-40.

The RF processing unit 1*h*-10 performs a function for transmitting or receiving a signal via a radio channel, such as band conversion and amplification of the signal. That is, the RF processing unit 1*h*-10 up-converts a baseband signal provided from the baseband processing unit 1*h*-20 into an RF band signal, transmits the converted RF band signal via the antenna, and then down-converts the RF band signal received via the antenna into a baseband signal. For example, the RF processing unit 1*h*-10 may include a transmission filter, a reception filter, an amplifier, a mixer, an oscillator, a digital-to-analog convertor (DAC), an analog-to-digital convertor (ADC), and the like. In FIG. 1H, only one antenna is illustrated, but the terminal may have a plurality of antennas. The RF processing unit 1*h*-10 may include a plurality of RF chains. The RF processing unit 1*h*-10 may perform beamforming. For beamforming, the RF processing unit 1*h*-10 may adjust a phase and a magnitude of each of signals transmitted or received via the plurality of antennas or antenna elements. The RF processing unit may perform MIMO, and may receive multiple layers when performing MIMO operations.

The baseband processing unit 1*h*-20 performs conversion between a baseband signal and a bitstream according to a physical layer specification of a system. For example, during data transmission, the baseband processing unit 1*h*-20 generates complex symbols by encoding and modulating a transmission bitstream. During data reception, the baseband processing unit 1*h*-20 reconstructs a reception bitstream via demodulation and decoding of the baseband signal provided from the RF processing unit 1*h*-10. For example, in a case of conforming to an orthogonal frequency division multiplexing (OFDM) scheme, during data transmission, the baseband processing unit 1*h*-20 generates complex symbols by encoding and modulating a transmission bitstream, maps the complex symbols to sub-carriers, and then configures OFDM symbols by performing an inverse fast Fourier transform (IFFT) operation and cyclic prefix (CP) insertion.

Further, during data reception, the baseband processing unit 1*h*-20 divides the baseband signal provided from the RF processing unit 1*h*-10 in units of OFDM symbols, reconstructs the signals mapped to the sub-carriers via a fast Fourier transform (FFT) operation, and then reconstructs the reception bitstream via demodulation and decoding.

The baseband processing unit 1*h*-20 and the RF processing unit 1*h*-10 transmit and receive signals as described above. Accordingly, the baseband processing unit 1*h*-20 and the RF processing unit 1*h*-10 may be referred to as a transmitter, a receiver, a transceiver, or a communication unit. Moreover, at least one of the baseband processing unit 1*h*-20 and the RF processing unit 1*h*-10 may include a plurality of communication modules to support a plurality of different radio access technologies. At least one of the baseband processing unit 1*h*-20 and the RF processing unit 1*h*-10 may include different communication modules to process signals in different frequency bands. For example, the different radio access technologies may include a wireless LAN (e.g., IEEE 802.11), a cellular network (e.g., LTE), and the like. Further, the different frequency bands may include a super high frequency (SHF) (e.g., 2. NRHz, NRhz) band and a millimeter wave (e.g., 60 GHz) band.

The storage unit 1*h*-30 stores data, such as a default program, an application program, and configuration information, for operation of the terminal. Particularly, the storage unit 1*h*-30 may store information related to a second access node that performs wireless communication by using a second radio access technology. The storage unit 1*h*-30 provides stored data in response to a request of the controller 1*h*-40.

The controller 1*h*-40 controls overall operations of the terminal. For example, the controller 1*h*-40 transmits or receives a signal via the baseband processing unit 1*h*-20 and the RF processing unit 1*h*-10. The controller 1*h*-40 records and reads data in the storage unit 1*h*-40. To this end, the controller 1*h*-40 may include at least one processor. For example, the controller 1*h*-40 may include a communication processor (CP) configured to perform control for communication and an application processor (AP) configured to control an upper layer, such as an application program.

Figure 1I:
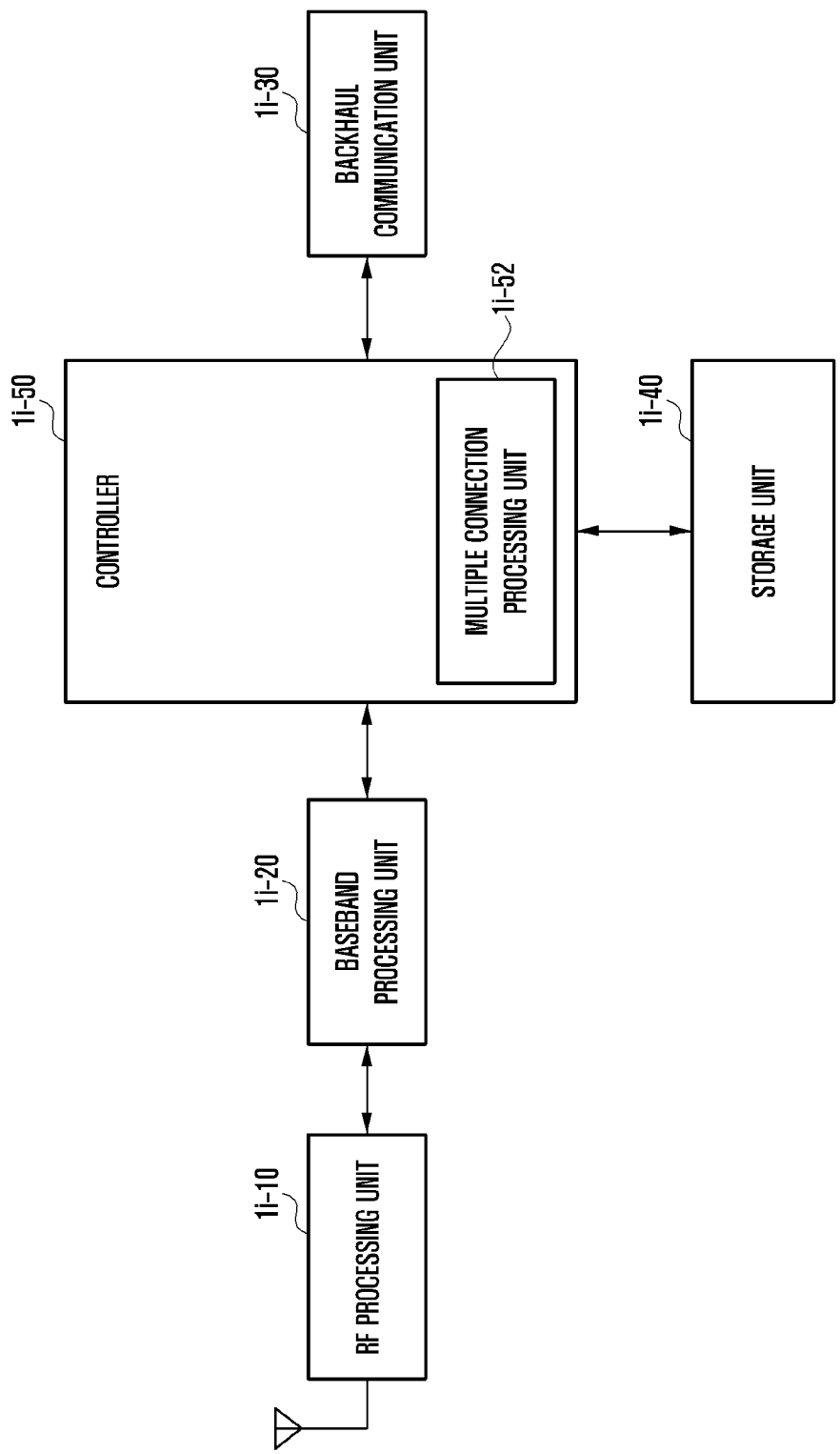
FIG. 1I is a block diagram illustrating a configuration of a base station according to the disclosure.

FIG. 1I illustrates a block configuration of a main base station in a wireless communication system according to an embodiment of the disclosure.

As illustrated in FIG. 1I, the base station includes an RF processing unit 1*i*-10, a baseband processing unit 1*i*-20, a backhaul communication unit 1*i*-30, a storage unit 1*i*-40, and a controller 1*i*-50.

The RF processing unit 1*i*-10 performs a function for transmitting or receiving a signal via a radio channel, such as band conversion and amplification of the signal. That is, the RF processing unit 1*i*-10 up-converts a baseband signal provided from the baseband processing unit 1*i*-20 into an RF band signal, transmits the converted RF band signal via an antenna, and then down-converts the RF band signal received via the antenna into a baseband signal. For example, the RF processing unit 1*i*-10 may include a transmission filter, a reception filter, an amplifier, a mixer, an oscillator, a DAC, an ADC, and the like. In FIG. 1I, only one antenna is illustrated, but a first access node may include a plurality of antennas. The RF processing unit 1*i*-10 may include a plurality of RF chains. The RF processing unit 1*i*-10 may perform beamforming. For beamforming, the RF processing unit 1*i*-10 may adjust a phase and a magnitude of each of signals transmitted or received via the plurality of antennas or antenna elements. The RF processing unit may perform a downlink MIMO operation by transmitting one or more layers.

The baseband processing unit 1*i*-20 performs a function of conversion between a baseband signal and a bitstream according to a physical layer specification of a first radio access technology. For example, during data transmission, the baseband processing unit 1*i*-20 generates complex symbols by encoding and modulating a transmission bitstream. During data reception, the baseband processing unit 1*i*-20 reconstructs a reception bitstream via demodulation and decoding of the baseband signal provided from the RF processing unit 1*i*-10. For example, in a case of conforming to an OFDM scheme, during data transmission, the baseband processing unit 1*i*-20 generates complex symbols by encoding and modulating a transmission bitstream, maps the complex symbols to sub-carriers, and then configures OFDM symbols by performing IFFT operation and CP insertion.

Further, during data reception, the baseband processing unit 1*i*-20 divides the baseband signal provided from the RF processing unit 1*i*-10 in units of OFDM symbols, reconstructs the signals mapped to the sub-carriers via an FFT operation, and then reconstructs the reception bitstream via demodulation and decoding. The baseband processing unit 1*i*-20 and the RF processing unit 1*i*-10 transmit and receive signals as described above. Accordingly, the baseband processing unit 1*i*-20 and the RF processing unit 1*i*-10 may be referred to as a transmitter, a receiver, a transceiver, a communication unit, or a wireless communication unit.

The backhaul communication unit 1*i*-30 provides an interface that performs communication with other nodes within a network. That is, the backhaul communication unit 1*i*-30 converts, into a physical signal, a bitstream transmitted from the main base station to another node, such as an auxiliary base station and a core network, and converts a physical signal received from the another node into a bitstream.

The storage unit 1*i*-40 stores data, such as a default program for operation of the main base station, an application program, and configuration information. Particularly, the storage unit 1*i*-40 may store information on a bearer assigned to a connected terminal, a measurement result reported from the connected terminal, and the like. The storage unit 1*i*-40 may store information serving as a criterion for determining whether to provide the terminal with multiple connections or to suspend the same. The storage unit 1*i*-40 provides stored data in response to a request of the controller 1*i*-50.

The controller 1*i*-50 controls overall operations of the main base station. For example, the controller 1*i*-50 transmits or receives a signal via the baseband processing unit 1*i*-20 and the RF processing unit 1*i*-10 or via the backhaul communication unit 1*i*-30. The controller 1*i*-50 records and reads data in the storage unit 1*i*-40. To this end, the controller 1*i*-50 may include at least one processor.

Second Embodiment

In the following description of the disclosure, if it is determined that a detailed description of a related disclosed function or configuration unnecessarily obscures a subject matter of the disclosure, the detailed description thereof will be omitted. Hereinafter, embodiments of the disclosure will be described with reference to the accompanying drawings.

Figure 2A:
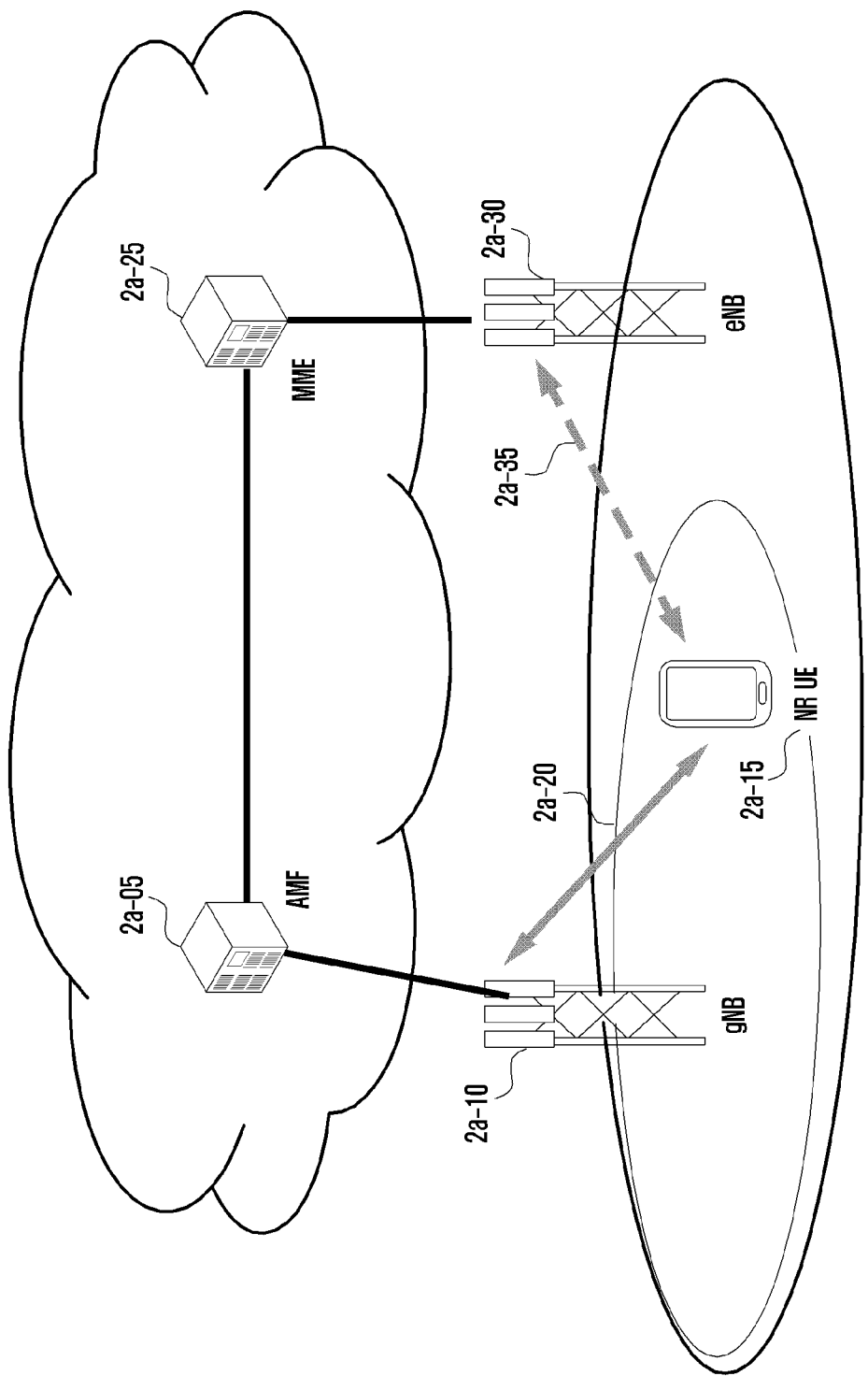
FIG. 2A is a diagram illustrating a structure of a next-generation mobile communication system.

FIG. 2A is a diagram illustrating a structure of a next-generation mobile communication system.

Referring to FIG. 2A, as illustrated, a radio access network of the next-generation mobile communication system (new radio, NR) includes a next-generation base station (new radio node B, hereinafter, gNB) 2*a*-10 and an AMF (new radio core network) 2*a*-05. A user terminal (new radio user equipment, hereinafter, NR UE or terminal) 2*a*-15 accesses an external network via the gNB 2*a*-10 and the AMF 2*a*-05.

In FIG. 2A, the gNB corresponds to an evolved node B (eNB) of the conventional LTE system. The gNB is connected to the NR UE via a radio channel, and may provide a service superior to that of an existing Node B, in 2*a*-20. In the next-generation mobile communication system, all user traffics are serviced via a shared channel, and therefore a device, which collects state information, such as buffer states, available transmission power states, and channel states of UEs, to perform scheduling, is required, and the gNB 2a-10 takes charge of collecting the state information to perform scheduling.

A single gNB typically controls a plurality of cells. In order to implement high-speed data transmission compared to the conventional LTE, an existing maximum bandwidth or wider may be available, and orthogonal frequency division multiplexing (hereinafter, referred to as OFDM) may be used as a radio access technology to further combine a beamforming technology. Further, an adaptive modulation & coding (hereinafter, referred to as AMC) scheme that determines a modulation scheme and a channel coding rate according to a channel state of a terminal is applied.

The AMF 2a-05 performs a function, such as mobility support, bearer configuration, and QoS configuration. The AMF is a device that is in charge of various control functions as well as a mobility management function for the terminal, and is connected to a plurality of base stations. Further, the next generation mobile communication system may be linked to the conventional LTE system, and the AMF is connected to an MME 2a-25 via a network interface. The MME is connected to an eNB 2a-30 that is an existing base station. A terminal supporting LTE-NR dual connectivity may transmit or receive data while maintaining a connection to the eNB as well as the gNB, in 2a-35.

In a next-generation mobile communication system, an NR-U technology capable of providing a data communication service by using only an unlicensed frequency band is being developed. The unlicensed frequency band is already used by other wireless communication systems, such as Wi-Fi, and a communication service provider may be shared with other next-generation mobile communication systems. In order to efficiently share and use the unlicensed frequency band between other wireless communication systems or between next-generation mobile communication systems operated by different service providers, a Listen-Before-Talk (LBT) procedure is required. The LBT procedure is a procedure of, before using the unlicensed frequency band, determining whether another user is using the unlicensed frequency band, and obtaining an opportunity to use the frequency band, via contention.

Therefore, an opportunity to transmit or receive data, as in a licensed frequency band, is not always guaranteed. In the disclosure, an LBT failure refers to a failure finally having occurred in obtaining a data transmission/reception opportunity for a specific time period, due to failing to be selected in contention or due to another system or terminal having already occupied a radio channel, via the LBT procedure. An LBT operation may be performed in both the base station and the terminal. For example, the terminal performs the LBT operation to perform downlink data transmission.

The conventional LTE system has various reporting mechanisms to optimize a service area. For example, the reporting mechanisms are an RLF report, an SCG failure report, an establishment failure report, MDT, etc. If a channel quality is poor, failures in multiple procedures due to a bad channel quality, and a specific error occur, an RLF, an SCG failure, and an establishment failure occur. Valid measurement information when the failures are declared is stored, and then is reported to the base station. An MDT may report measurement information to the base station periodically or on the basis of an event, according to a configuration from the base station. The information reported to the base station is used for mobile communication service providers to optimize service areas.

The LBT failure may cause a failure of an operation required for conventional data transmission/reception. For example, when switching to a connected mode, the terminal performs random access for a handover, uplink timing synchronization, or the like. In this case, a preamble and msg3 should be transmitted via an uplink, but if the terminal experiences an LBT failure, the message cannot be transmitted. This results in an RLF, an SCG failure, and an establishment failure. If conventional information is configured and reported to the base station, the base station is unable to distinguish whether a corresponding failure has occurred due to a conventional reason or an LBT failure.

An LBT failure is not caused by a poor channel quality, but is due to a failure in a contention procedure. Therefore, the base station should be able to distinguish the cause of the LBT failure on the basis of the report. This is because if an LBT failure has occurred, there is no need to further optimize a service area. In the disclosure, in reporting mechanisms, such as an RLF, an SCG failure, an establishment failure, and an MDT, a terminal indicates whether an LBT failure has occurred. Further, a procedure of detecting and declaring an LBT failure is proposed.

Figure 2B:
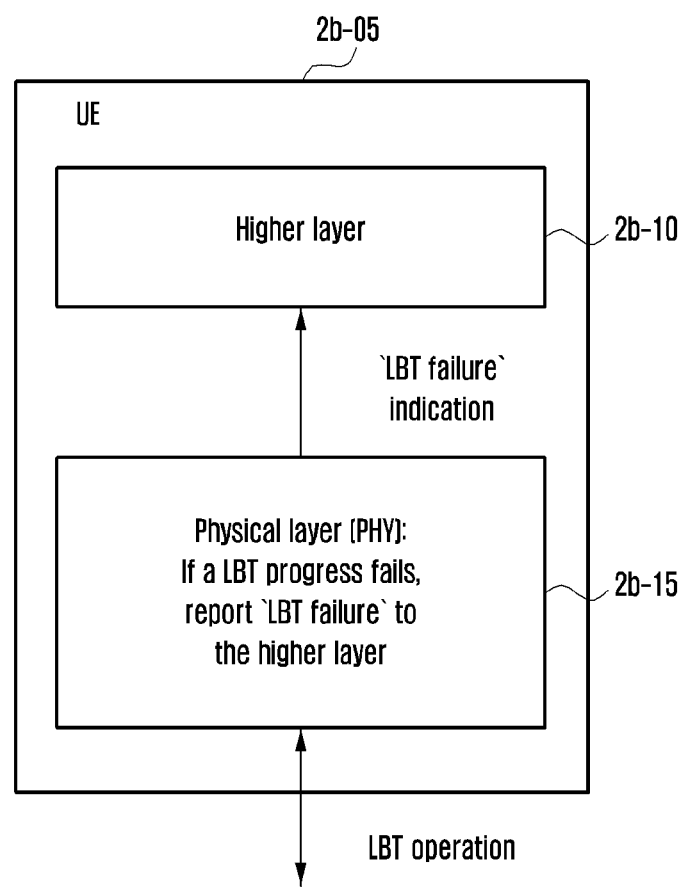
FIG. 2B is a diagram describing a procedure of monitoring and detecting an LBT failure by a terminal in the disclosure.

FIG. 2B is a diagram describing a procedure of monitoring and detecting an LBT failure by a terminal in the disclosure.

In the disclosure, a terminal 2b-05 detects an LBT failure in a physical layer 2b-15 or a MAC layer. One LBT failure detected in the layer is reported to a higher layer, that is, RRC 2b-10 via an "LBT failure" indicator. The one LBT failure refers to a time when the final contention fails in the LBT procedure described in FIG. 2C and FIG. 2D below. The LBT failure may not be regarded as a cause of the RLF, SCG failure, or establishment failure. However, if the LBT failure occurs frequently, it may be desirable to declare an RLF and find another suitable cell, rather than continuously attempting access in a current cell.

Therefore, in the disclosure, if an LBT failure occurs a predetermined number of times or a number of times configured based on system information or more, the RLF, SCG failure, and establishment failure are declared.

Figure 2C:
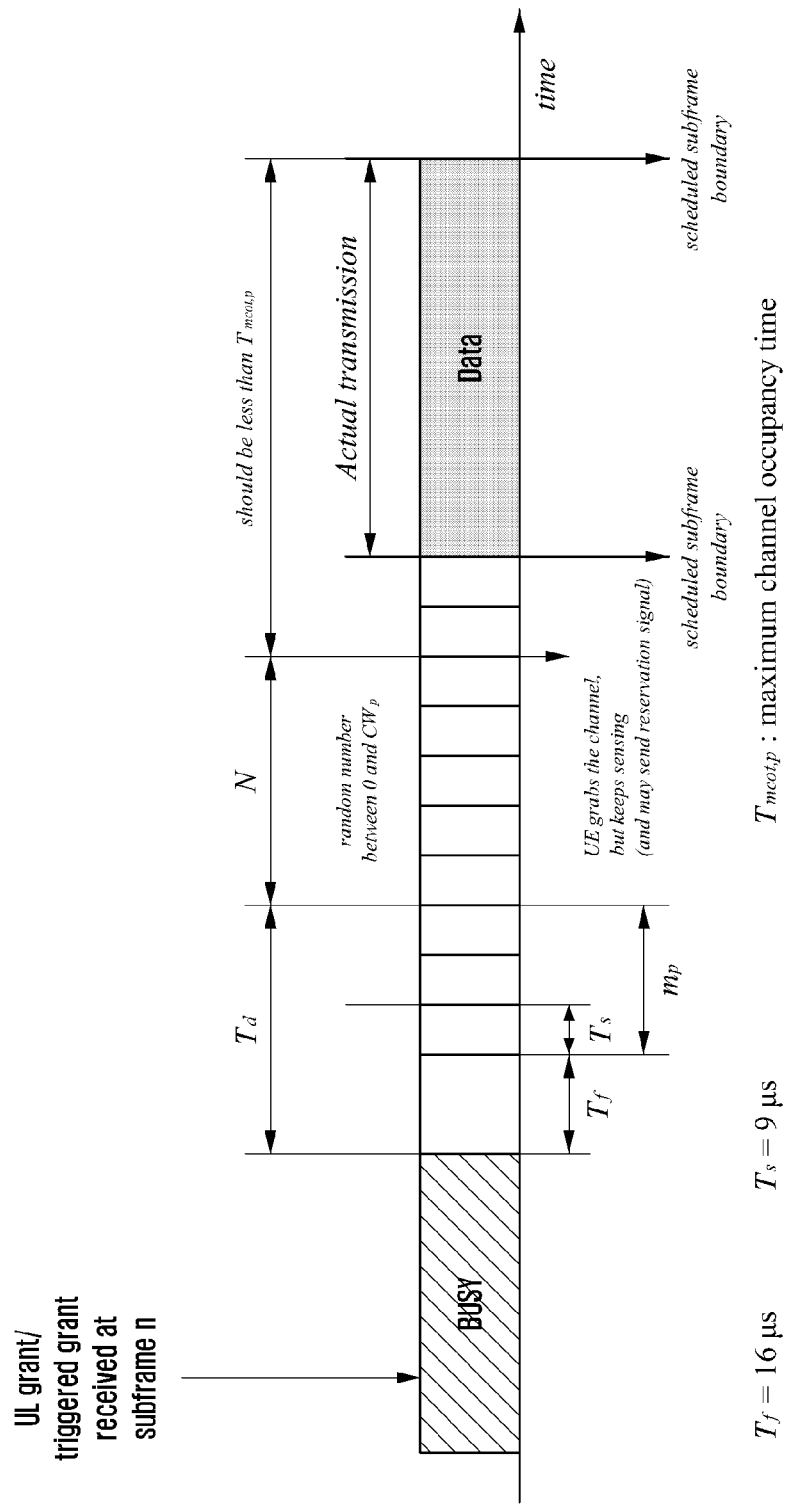
FIG. 2C is a diagram illustrating LBT Type 1.

FIG. 2C is a diagram illustrating LBT Type 1.

LBT type 1 is a method of randomly determining, before performing transmission, a time to listen to whether other peripheral devices perform transmission, and performing transmission when a channel is vacant for a corresponding random time period. A communication device first listens to whether a channel is vacant for a fixed time ($T_d$), and when the channel is vacant, determines whether the channel is vacant for the random time period (N).

It is possible to differentially determine how to determine values of the $T_d$ and N according to a priority and importance of traffic, and there are a total of four different classes. The class is referred to as a channel access priority class (CAPC).

According to the CAPC, a time length of $T_d$=16+mp*9 (μs) is obtained, and N=random (0,$CW_p$)*9 (μs) is obtained, where a CW value starts from $CW_{min,p}$, and at each time when transmission fails, the CW value doubles and has a maximum value of $CW_{max,p}$. For example, if LBT is performed using a scheme in which the CAPC is 3, $T_d$ has a length of 16+3*9=43 μs, and N selects a random value between 0 and 15 for initial transmission, wherein for example, if 7 is selected, N is 7*9=63 μs, and the communication device transmits data when the channel is vacant for 106 μs.

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

In the example (when 7 is selected for N), if it is determined that a channel is occupied by another device (that is, a received signal strength (RSSI) is equal to or greater than a predetermined threshold value) in the middle of determining whether the channel is vacant (for example, in a case of 4 after passing 3 out of 7), a terminal waits until the end of the channel occupancy, waits for $T_d$ again, determines whether the channel is vacant for the remaining time period of 4, and then performs transmission.

As shown in the table above, an LBT scheme having a low CAPC is used when traffic having a high priority is transmitted.

Figure 2D:
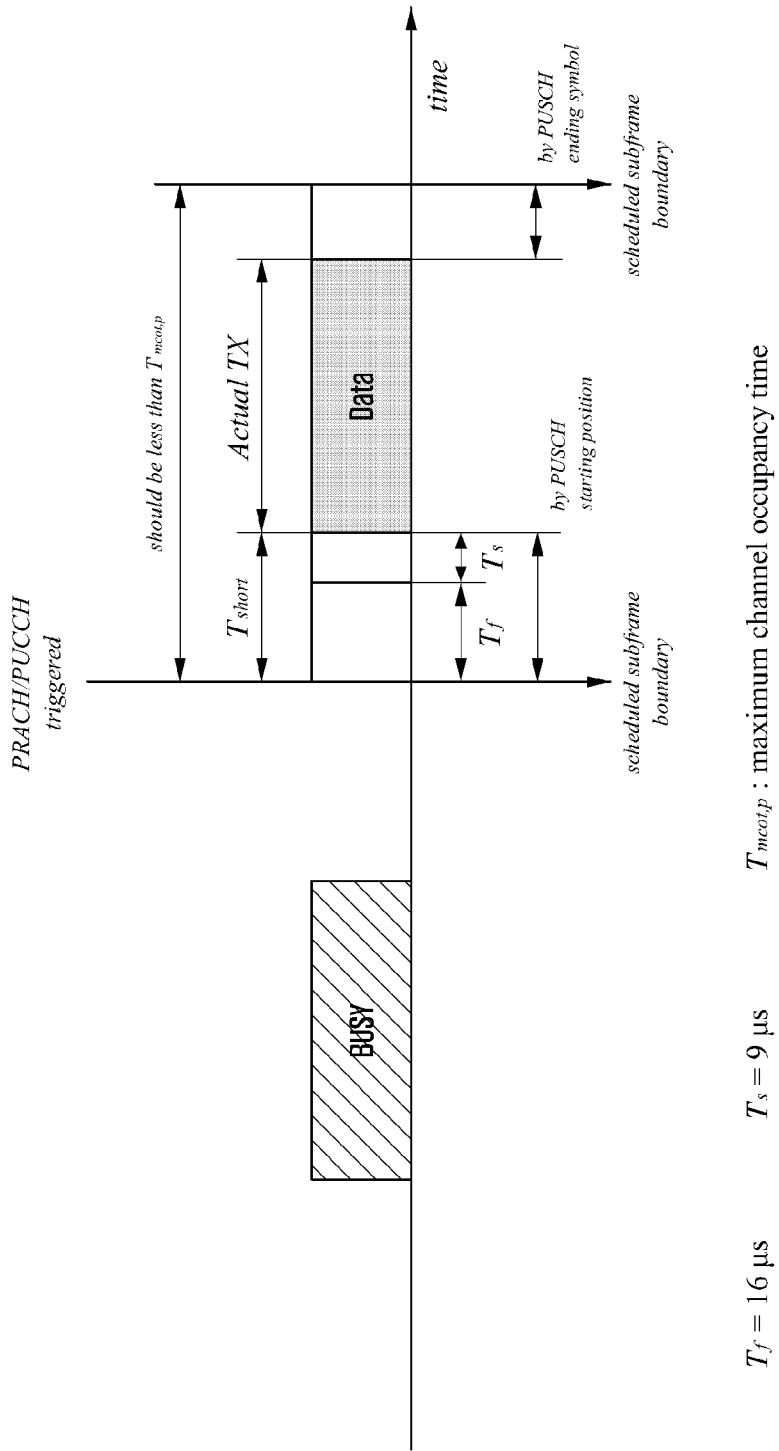
FIG. 2D is a diagram illustrating LBT type 2.

FIG. 2D is a diagram illustrating LBT type 2.

LBT type 2 is a method in which a time to listen, before performing transmission, to whether other peripheral devices perform transmission is fixed, and therefore transmission is immediately performed when a channel is vacant for the fixed time period. That is, in the exemplary diagram, LBT type 2 is a scheme, in which when a communication device needs to perform transmission, the communication device listens to (senses) the channel for the fixed time period of Tshort (=Tf+Ts), and immediately transmits data if the channel is determined to be vacant. This is an LBT scheme that can be used when a signal having a very high priority is transmitted. Accordingly, the random access preamble (1d-11 of FIG. 1D) described in FIG. 1D, the described physical uplink control channel (PUCCH), etc. are signals having high importance, and should be transmitted using the LBT scheme.

As described above, in consideration of a scenario in which the 5G system operates in an unlicensed band, if the random access scheme described in FIG. 1D is performed, LBT should be performed for each transmission to perform transmission. Accordingly, there is a problem that the random access may be significantly delayed. To this end, a method of reducing the aforementioned random access procedure having four operations to a random access procedure having two operations may be considered.

Figure 2E:
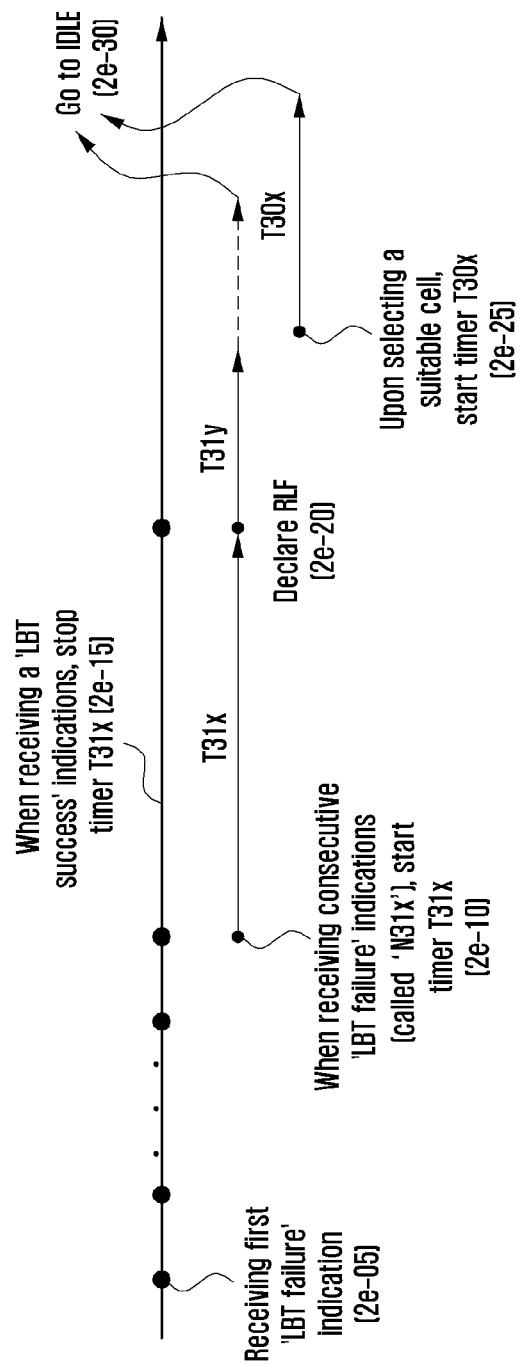
FIG. 2E is a diagram illustrating a procedure of declaring, by RRC, an RLF due to an LBT failure in the disclosure.

FIG. 2E is a diagram illustrating a procedure of declaring, by RRC, an RLF due to an LBT failure in the disclosure.

RRC of a terminal performing data transmission/reception or a handover operation in a connected mode receives an "LBT failure" indicator from a lower layer, such as a physical layer or a MAC layer, in 2e-05. If the "LBT failure" indicator is continuously received a predetermined number of times or a number of times configured based on system information, the RRC operates a predetermined timer T31x, in 2e-10. If the RRC receives, in the lower layer, an "LBT success" indicator at least once, a predetermined number of times, or a number of times configured based on the system information before the timer expires, the RRC stops the timer, in 2e-15.

If the timer expires, the RRC declares an RLF depending on a situation, in 2e-20. The RRC stores valid measurement information, triggers a re-establishment procedure, and operates a timer T31y. If no other suitable cell is found until the timer expires, the terminal switches a mode to a standby mode, in 2e-30. If the RRC finds another suitable cell, the RRC stops the timer T31y, operates a timer T30x, and transmits a re-establishment request message to the suitable cell, in 2e-25. If the re-establishment procedure is not successfully completed before the timer T30x expires, the terminal also switches the mode to the standby mode.

The procedure has been described based on the RLF, but the failure declaration procedure based on the "LBT failure" indicator and the "LBT success" indicator may be applied even in the SCG failure or the establishment failure.

RRC of a terminal performing data transmission/reception or a handover operation in the connected mode receives an "LBT failure" indicator from a lower layer, such as a physical layer or a MAC layer. When a base station fails to transmit a reference signal due to an LBT failure, and the physical layer of the terminal recognizes the same, the "LBT failure" indicator is transferred to a higher layer. The reference signal is an RLM-RS.

When the RRC continuously receives the "LBT failure" indicator a predetermined number of times or a number of times configured based on the system information or dedicated signaling, for a predetermined time period, the RRC declares an RLF. The RRC stores valid measurement information, triggers a re-establishment procedure, and operates the timer T31y. If no other suitable cell is found until the timer expires, the terminal switches a mode to the standby mode. If the RRC finds another suitable cell, the RRC stops the timer T31y, operates the timer T30x, and transmits an RRCReestablishmentRequest message to the suitable cell. The RRCReestablishmentRequest message includes, as a ReestablishmentCause value, a new "LBT failure" cause value indicating that the re-establishment procedure has been initialized due to the LBT failure. If the re-establishment procedure is not successfully completed before the timer T30x expires, the terminal also switches the mode to the standby mode.

If the LBT failure occurs continuously, the reestablishment messages may not be transmitted or received. Here, continued camp-on in a current serving cell may continue service interruption. Therefore, if the LBT failure continues a preconfigured number of times or a number of times configured based on the system information or dedicated signaling, the terminal may automatically release the current serving cell and may attempt to connect to another cell. Alternatively, if the LBT failure continues for a predetermined time period, the terminal may automatically release the current serving cell and attempt to connect to another cell.

As another method, if the RRC receives the "LBT failure" indicator a predetermined number of times or a number of times configured based on the system information or dedicated signaling, continuously for the predetermined time period, the RRC reports the continuous LBT failure to the base station by using a predetermined message.

Figure 2F:
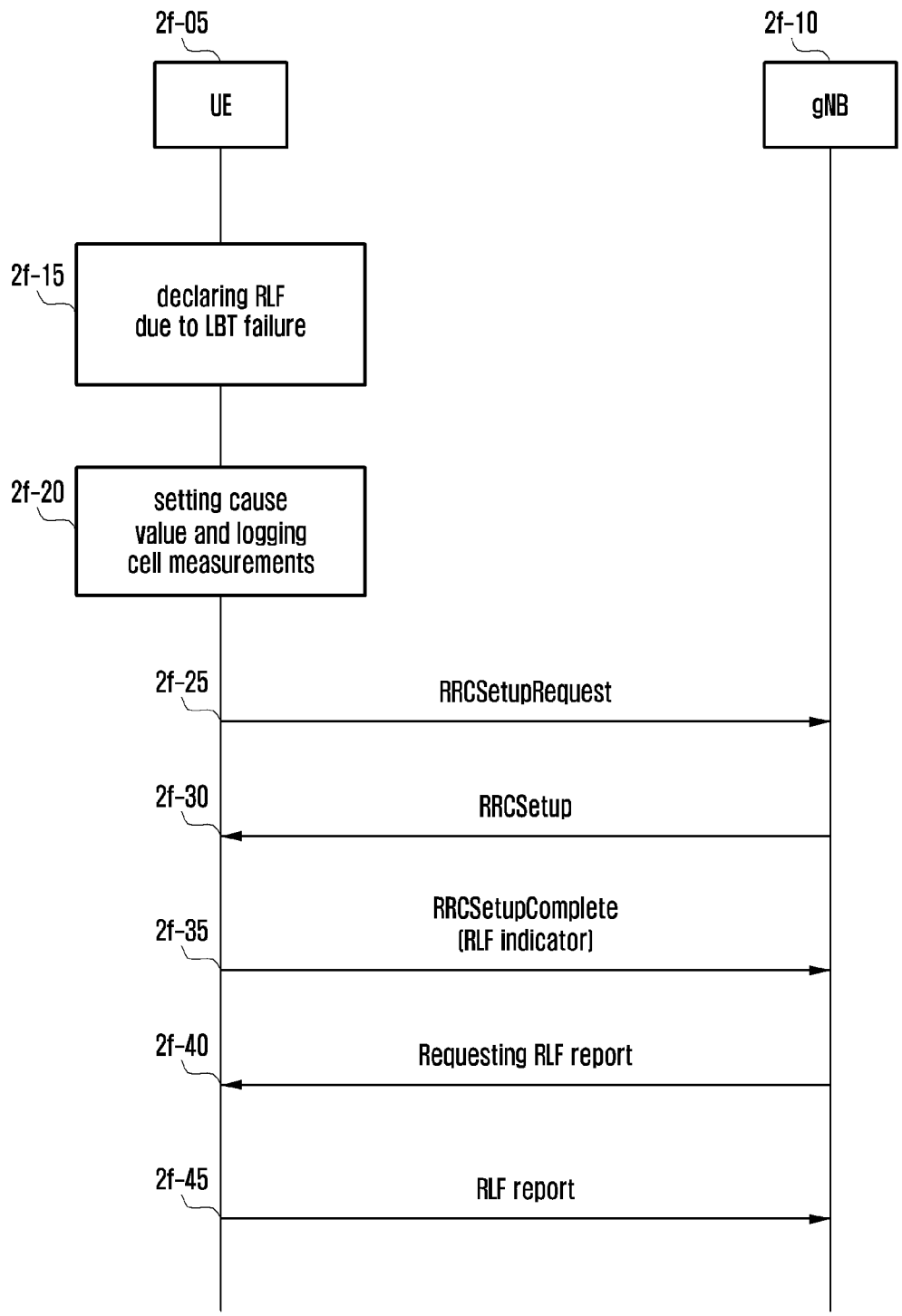
FIG. 2F is a flowchart of a procedure of reporting an RLF due to an LBT failure in a 2-1th embodiment.

FIG. 2F is a flowchart of a procedure of reporting an RLF due to an LBT failure in a 2-1th embodiment.

A terminal 2f-05 declares one RLF due to an LBT failure, in 2f-15. The RLF declaration due to the LBT failure has been described above with reference to FIG. 2E. The terminal stores valid measurement information and configures a cause value of the RLF to the LBT failure, in 2f-20. Thereafter, the terminal stores the valid measurement information and the cause value in an RLF report, and then reports the same to the base station. For example, a new cause value may be inserted into a connectionFailureType field in the RLF report IE,

| | | |
|---|---|---|
| connectionFailureType | ENUMERATED {rlf, hof, lbtFailure} | OPTIONAL, | or the new cause value may be inserted into an rlf-Cause field.

| | |
|---|---|
| rlf-Cause | ENUMERATED { t310-Expiry, randomAccessProblem, rlc-MaxNumRetx, t312-Expiry, lbtFailure}, |

Further, additional information may be included in the RLF report. For example,
- Time elapsed since the last LBT initialization until RLF declaration
- Channel occupancy information of a serving cell. a ratio of occupying a channel by the serving cell for a predetermined time period via an LBT procedure
- Cell information of another mobile communication service provider. Cell ID, PLMN information, cell signal strength, and channel occupancy information
- Physical cell identity (PCI) information (e.g., PCI confusion) used by other mobile communication service providers
- BWP configuration information of a serving cell or a cell of another mobile communication service provider The terminal transmits an RRCSetupRequest message to one base station 2*f*-10, in 2*f*-25. The base station transmits an RRCSetup message to the terminal in response to the message, in 2*f*-30. The terminal transmits, to the base station, an RRCSetupComplete message including an indicator indicating that the terminal stores therein information in relation to the RLF, in 2*f*-35. The base station requests the RLF report by using a predetermined RRC message, in 2*f*-40. The terminal reports the RLF report to the base station according to the request, in 2*f*-45.

Figure 2G:
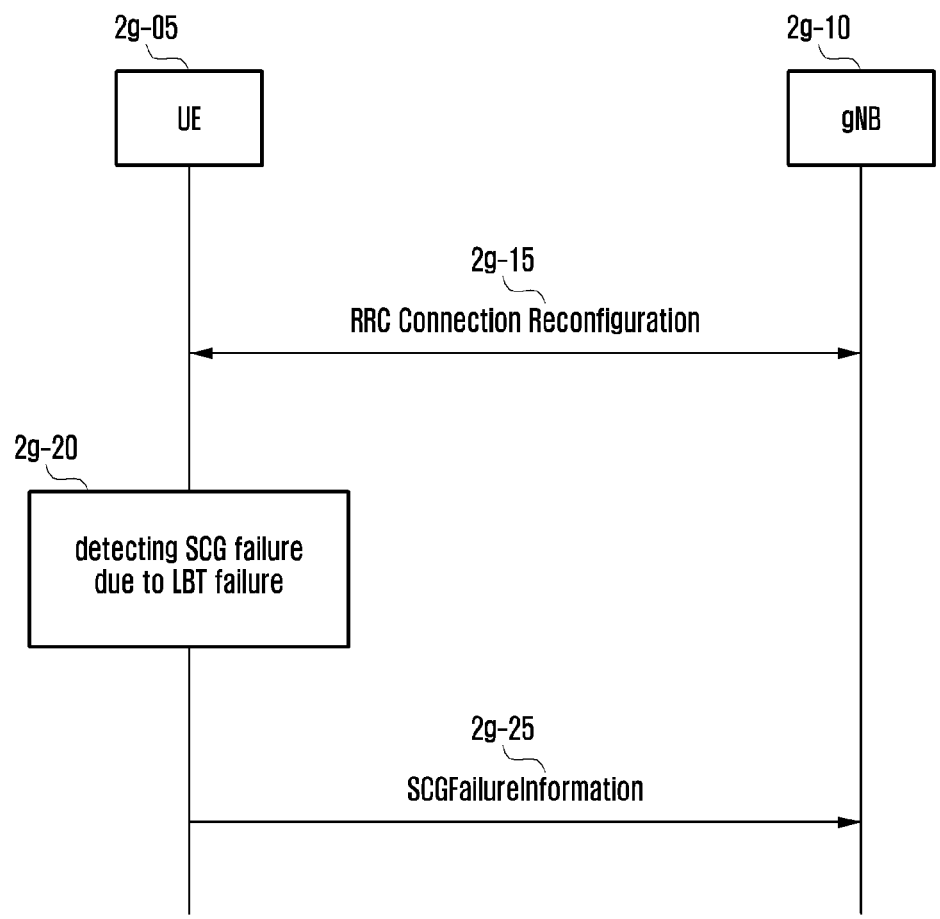
FIG. 2G is a flowchart of a procedure of reporting an SCG failure due to an LBT failure in a 2-2th embodiment.

FIG. 2G is a flowchart of a procedure of reporting an SCG failure due to an LBT failure in a 2-2th embodiment.

Figure 2H:
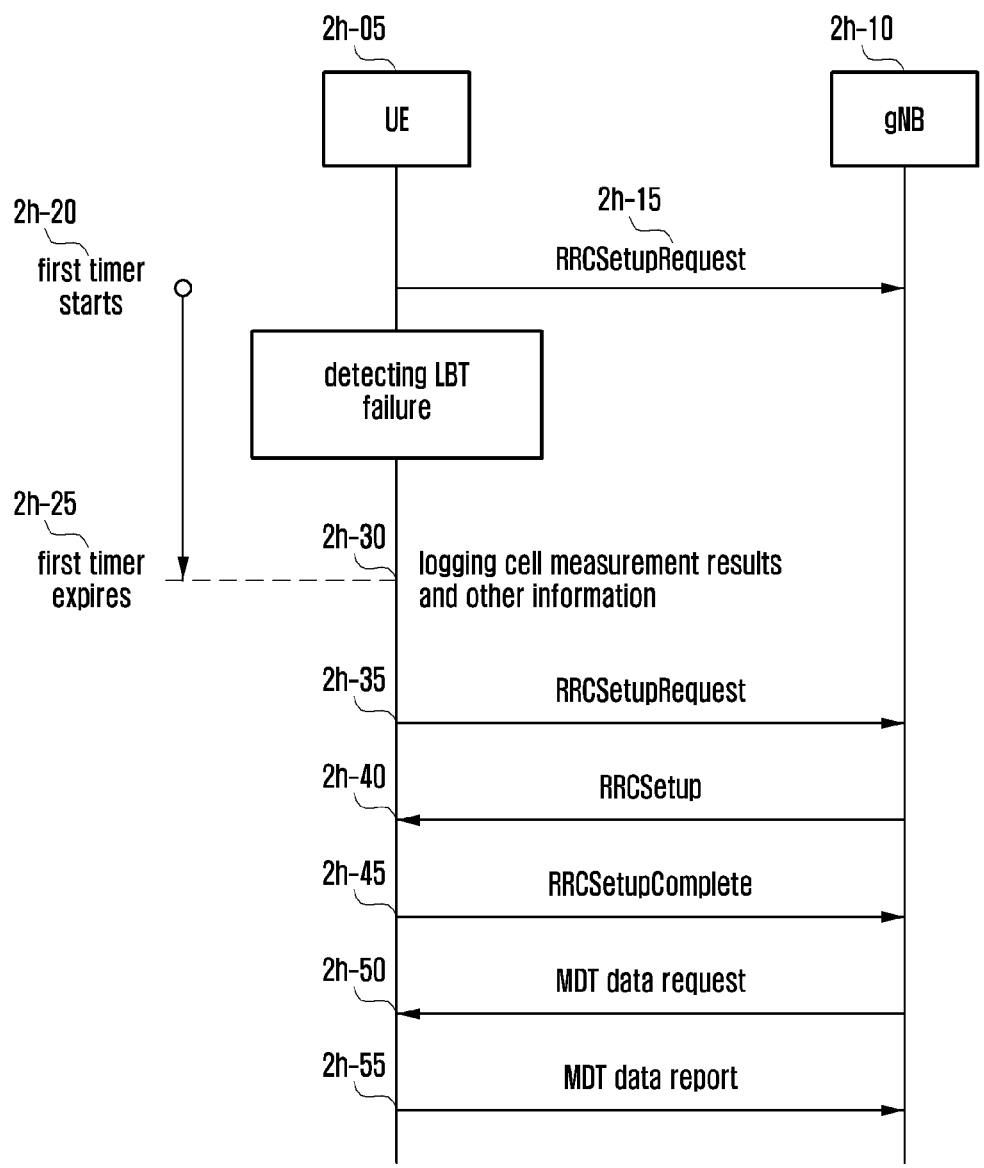
FIG. 2H is a flowchart of a procedure of reporting an establishment failure due to an LBT failure in a 2-3th embodiment.

A terminal 2*g*-05, for which dual connectivity is configured, transmits data to and receives data from a plurality of base stations. A group of serving cells belonging to a secondary node is referred to as a secondary cell group (SCG). The serving cells belonging to the SCG are configured based on an RRCReconfiguration message, in 2*g*-15. PSCell having a PUCCH exists in the SCG, an SCG failure is declared when the following problem occurs for the cell, and the terminal reports, to a base station, the SCG failure by using an SCGFailureInformation message. According to a type of the problem, a cause value of the following SCG failure is determined. In the disclosure, a new LBT failure may be indicated in the cause value.
- t310-Expiry: for a time when a timer T310 has expired
- randomAccessProblem: for a time when an RA problem is declared in the MAC layer
- rlc-MaxNumRetx: for a time when the maximum number of retransmissions of ARQ is reached in the RLC layer
- scg-ChangeFailure: for a time when an SCG change fails
- scg-reconfigFailure: for a time when SCG configuration information cannot be understood
- srb3-IntegrityFailure: for a time when an integrity check of SRB3 fails
- LBT failure: for a time when one or more determined or configured number of times of LBT procedures fail in succession If the cause value is "LBT failure", additional information may be included in the SCGFailureInformation message. For example,
- Time elapsed since the last LBT initialization until RLF declaration
- Channel occupancy information of a serving cell. A ratio of occupying a channel by the serving cell for a predetermined time period via an LBT procedure
- Cell information of another mobile communication service provider. Cell ID, PLMN information, cell signal strength, and channel occupancy information
- Physical cell identity (PCI) information (e.g., PCI confusion) used by other mobile communication service providers
- BWP configuration information of a serving cell or a cell of another mobile communication service provider FIG. 2H is a flowchart of a procedure of reporting an establishment failure due to an LBT failure in a 2-3th embodiment.

A terminal 2*h*-05 in a standby mode may trigger an establishment procedure in order to switch a mode to a connected mode. The terminal starts the establishment procedure while transmitting an RRC Setup Request message to a base station 2*h*-10. While transmitting the RRC Setup Request message in 2*h*-15, the terminal operates a first timer in 2*h*-20. The RRC Setup Request message is included in msg3 in a random access procedure so as to be transmitted to the base station. The first timer stops when an RRC Setup message is received from the base station or cell reselection is performed. If the RRC Setup message cannot be received from the base station until the first timer expires in 2*h*-25, the terminal considers that the triggered establishment procedure has failed. Here, the terminal stores collected cell measurement information and other additional information, in 2*h*-30. At least one piece of the information listed below is included.
- Indicator indicating whether the establishment failure has occurred due to an LBT failure
- Information on the number of LBT failures while the first timer is operating, or the number of message transmissions that have failed to be attempted due to an LBT failure
- Information on a time period in which an LBT failure has occurred
- Time elapsed since the last LBT initialization until RLF declaration
- Channel occupancy information of a serving cell. a ratio of occupying a channel by the serving cell for a predetermined time period via an LBT procedure
- Cell information of another mobile communication service provider. Cell ID, PLMN information, cell signal strength, and channel occupancy information
- Physical cell identity (PCI) information (e.g., PCI confusion) used by other mobile communication service providers
- BWP configuration information of a serving cell or a cell of another mobile communication service provider
- CGI information (global cell ID) or PCI information (physical cell ID) of a cell in which the establishment failure has been detected Signal strength, RSRP, RSRQ, and SINR information of the cell, in which the establishment failure has been detected, and a neighboring cell thereof Beam level signal strength, RSRP, RSRQ, and SINR information of a cell, in which a resume failure has been detected, and a neighboring cell thereof if the cells support beam operation Valid location information of the terminal Valid speed information of the terminal Information on the number of preambles transmitted by the MAC layer in a random access triggered for the establishment procedure Indicator indicating whether unsuccessful contention resolution has occurred with respect to a preamble transmitted at least once in the random access triggered for the establishment procedure Indicator indicating whether terminal transmission power used in a last transmission preamble in the random access triggered for the establishment procedure has reached the maximum terminal power There may be multiple criteria to determine whether the establishment failure has occurred due to an LBT failure. For example, there may be a case in which one or more predetermined or configured LBT failures occur while the first timer is operating, so that the terminal cannot satisfy the predetermined number of msg3 transmission attempts while the first timer is operating.

After a predetermined time elapses, the terminal re-attempts the establishment procedure for switching from the standby mode to the connected mode. The terminal transmits the RRC Setup Request message to the base station, in 2h-35. In response to the RRC Setup Request message, the base station transmits the RRC Setup message to the terminal, in 2h-40. The terminal includes, in an RRC Setup Complete message, an indicator indicating whether there is Establishment failure information stored in the terminal itself, in 2h-45. If the base station wants to receive a report on the establishment failure information, the base station receives the RRC Resume Complete message, and then requests the terminal to report the Establishment failure information by using a predetermined RRC message, in 2h-50. Accordingly, the terminal reports the stored Establishment failure information to the base station by using the predetermined RRC message, in 2h-55.

Alternatively, as in the 2-2th embodiment, retrieval for Establishment failure and Resume failure information may not be allowed in the operation 2 Resume procedure.

As another method, if an establishment failure occurs due to an LBT failure, the terminal does not report the establishment failure to the base station.

Figure 2I:
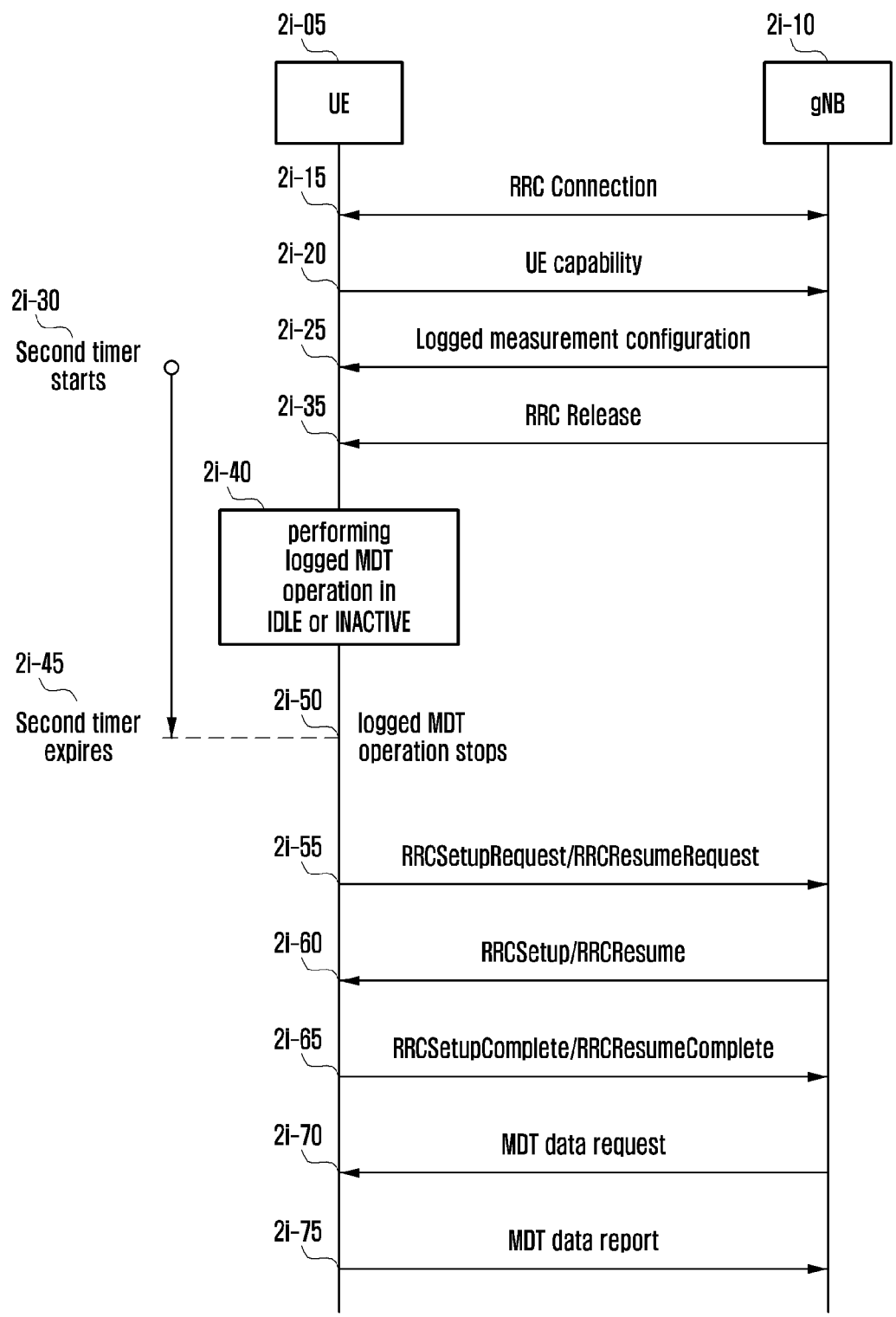
FIG. 2I is a flowchart of a procedure of reporting an MDT measurement result due to an LBT failure in a 2-4th embodiment.

FIG. 2I is a flowchart of a procedure of reporting an MDT measurement result due to an LBT failure in a 2-4th embodiment.

A terminal 2i-05 establishes a connection with a base station 2i-10, in 2i-15. The terminal provides terminal capability information to the base station in 2i-20, and may indicate whether the terminal itself supports an MDT operation and may indicate a frequency that the terminal is able to measure. The base station includes, in a predetermined RRC message, configuration information necessary for performing a Logged MDT operation, and transmits the RRC message to the terminal in 2i-25. For example, the configuration information includes at least one of the following information.

Trace Reference Information

Trace Recording Session Reference Information

Trace Collection Entity (TCE) ID Information: The base station transmits MDT data information, which has been reported from the terminal, to a data server designated by a TCE ID.

Absolute Time Information: An absolute time in a current cell that provides Logged MDT configuration information Area Configuration: Area information indicated in units of cells, in which measurement information may be collected and stored via the Logged MDT operation. RAT information for which measurement information should be collected may also be included. A list included in the RAT information is a black list or a white list. If the list is a black list, cell measurement information is collected for an RAT that is not included in the list. If the list is a white list, cell measurement information is not collected for the RAT that is not included in the list.

Logging Duration: A value of the first timer. When the timer is operating, the Logged MDT operation is performed in a standby mode or an inactive mode.

Logging Interval: An interval of storing collected information plmn-IdentityList: PLMN list information. Not only performing of the Logged MDT operation, but also PLMN information, which enables reporting of MDT data and reporting of whether MDT data is stored, are included.

Indicator indicating whether the Logged MDT operation is performed in the standby mode, inactive mode, or both. The indicator may indicate an RRC state in which the Logged MDT operation is performed, or it may be defined that the Logged MDT operation is always performed in the standby mode and inactive mode without the indicator. The terminal performs the Logged MDT operation only in the RRC state indicated by the indicator.

Indicator indicating whether to collect and store beam level measurement information. In the next-generation mobile communication system, a beam antenna may be applied. Without the indicator, for a frequency at which a beam-based operation is performed, it may be defined that beam level measurement is always collected and stored.

Information on the maximum number of beams, which is to be collected or stored, and information on the minimum signal strength of a beam, which is to be stored. The terminal skips storing information on a beam, the signal strength of which is weaker than the minimum signal strength. If all beams have values weaker than the configured minimum signal value, the terminal may store information of one beam having a strongest signal strength from among all the beams, or may include an indicator indicating that all the beams have values weaker than the configured minimum signal value.

Indicator indicating whether an MDT retrieval operation can be triggered in an operation 2 resuming procedure (RRC Resume).

The terminal having received the Logged MDT configuration information operates the second timer, in 2i-30. A value of the first timer is configured to be equal to a value of the Logging Duration. The base station switches a mode of the terminal to the standby mode or the inactive mode by using an RRC Release message, in 2i-35. Depending on an RRC state, to which switching is performed, configuration information for an operation in the RRC state is included in the RRC Release message. If the second timer is being operated, the terminal performs Logged MDT in the standby mode or the inactive mode, in 2i-40. The terminal stores at least one piece of the following information in each logging period.

Information on the number of LBT failures in each logging interval while the second timer is operating, or the number of message transmissions that have failed to be attempted due to an LBT failure Information of a time period in which an LBT failure has occurred in each logging interval while the second timer is operating Channel occupancy information of a serving cell in each logging interval while the second timer is operating. A ratio of occupying a channel by the serving cell for a predetermined time period via an LBT procedure Cell information of another mobile communication service provider. Cell ID, PLMN information, cell signal strength, and channel occupancy information Physical cell identity (PCI) information (e.g., PCI confusion) used by other mobile communication service providers BWP configuration information of a serving cell or a cell of another mobile communication service provider CGI information (global cell ID) or PCI information (physical cell ID) of a serving cell and a neighboring cell thereof Signal strength, RSRP, RSRQ, and SINR information of a serving cell and a neighboring cell thereof Beam level signal strength, RSRP, RSRQ, and SINR information of a cell, in which a resume failure has been detected, and a neighboring cell thereof if the cells support beam operation Valid location information of the terminal Valid speed information of the terminal If beam level measurement is configured, a signal strength value for a beam, which is greater than the configured minimum value in a serving cell and a neighboring cell thereof The maximum number of beams which can be stored is configured or predefined. The signal strength refers to RSRP, RSRQ, or SINR. The collected information is stored in each Logged Interval.

Each piece of log information stored in each interval includes an indicator indicating whether the stored information has been collected in the standby mode or has been collected in the inactive mode.

If the second timer expires in 2i-45, the Logged MDT operation is suspended, in 2i-50.

The terminal initiates the establishment or resume procedure for switching from the standby mode or inactive mode to the connected mode. The terminal transmits an RRC Setup Request or RRC Resume Request message to the base station, in 2i-55. The terminal includes, in an RRC Setup Complete or RRC Resume Complete message, an indicator indicating whether there is MDT data stored in the terminal itself, in 2i-65. After receiving the RRC Setup Complete or RRC Resume Complete message, the base station requests the terminal to report the MDT data by using the predetermined RRC message, in 2i-70. Accordingly, the terminal reports the stored MDT data to the base station by using the predetermined RRC message, in 2i-75.

Figure 2J:
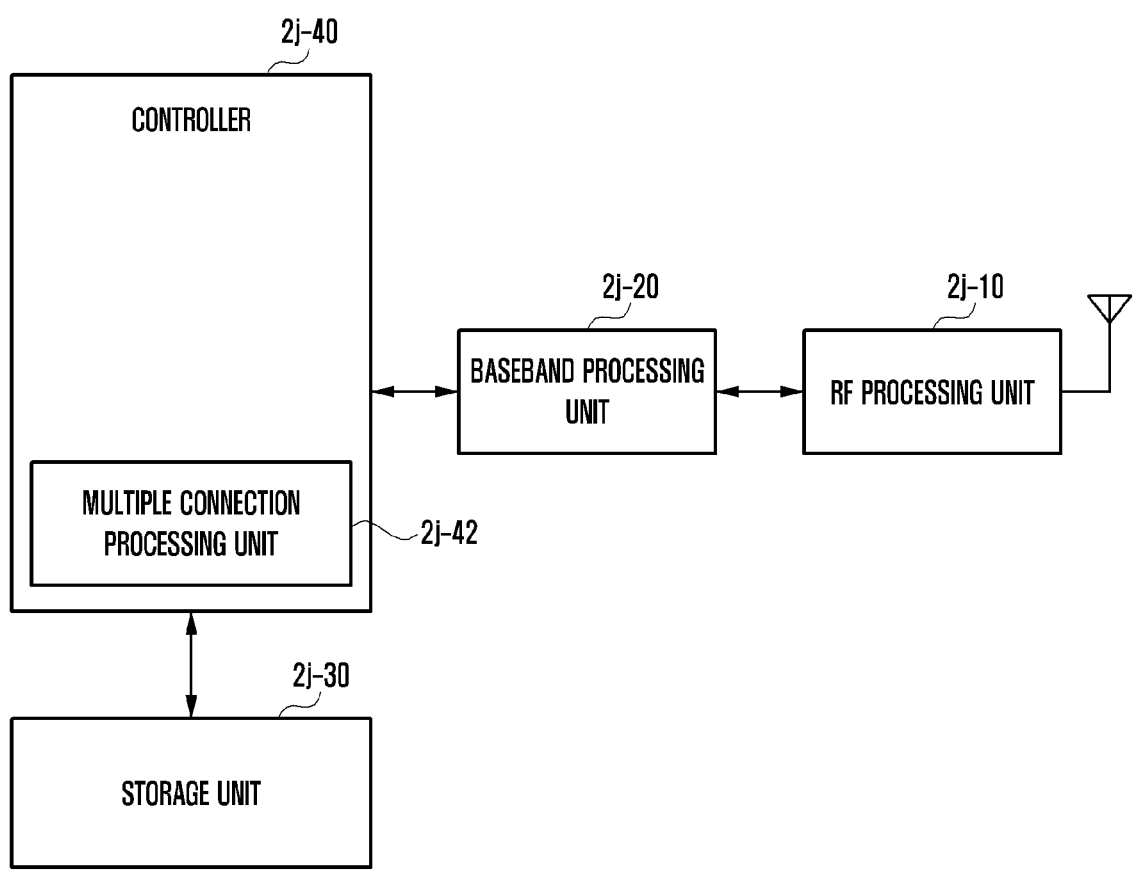
FIG. 2J is a block diagram illustrating an internal structure of a terminal, to which the disclosure has been applied.

FIG. 2J illustrates a structure of a terminal.

Referring to FIG. 2J, the terminal includes a radio frequency (RF) processing unit 2j-10, a baseband processing unit 2j-20, a storage unit 2j-30, and a controller 2j-40.

The RF processing unit 2j-10 performs a function for transmitting or receiving a signal via a radio channel, such as band conversion and amplification of the signal. That is, the RF processing unit 2j-10 up-converts a baseband signal provided from the baseband processing unit 2j-20 into an RF band signal, transmits the converted RF band signal via the antenna, and then down-converts the RF band signal received via the antenna into a baseband signal. For example, the RF processing unit 2j-10 may include a transmission filter, a reception filter, an amplifier, a mixer, an oscillator, a digital-to-analog convertor (DAC), an analog-to-digital convertor (ADC), and the like. In FIG. 2J, only one antenna is illustrated, but the terminal may have a plurality of antennas.

The RF processing unit 2j-10 may include a plurality of RF chains. The RF processing unit 2j-10 may perform beamforming. For beamforming, the RF processing unit 2j-10 may adjust a phase and a magnitude of each of signals transmitted or received via the plurality of antennas or antenna elements. The RF processing unit may perform MIMO, and may receive multiple layers when performing MIMO operations.

The baseband processing unit 2j-20 performs conversion between a baseband signal and a bitstream according to a physical layer specification of a system. For example, during data transmission, the baseband processing unit 2j-20 generates complex symbols by encoding and modulating a transmission bitstream. During data reception, the baseband processing unit 2j-20 reconstructs a reception bitstream via demodulation and decoding of the baseband signal provided from the RF processing unit 2j-10. For example, in a case of conforming to an orthogonal frequency division multiplexing (OFDM) scheme, during data transmission, the baseband processing unit 2j-20 generates complex symbols by encoding and modulating a transmission bitstream, maps the complex symbols to sub-carriers, and then configures OFDM symbols by performing an inverse fast Fourier transform (IFFT) operation and cyclic prefix (CP) insertion.

Further, during data reception, the baseband processing unit 2j-20 divides the baseband signal provided from the RF processing unit 2j-10 in units of OFDM symbols, reconstructs the signals mapped to the sub-carriers via a fast Fourier transform (FFT) operation, and then reconstructs the reception bitstream via demodulation and decoding.

The baseband processing unit 2j-20 and the RF processing unit 2j-10 transmit and receive signals as described above. Accordingly, the baseband processing unit 2j-20 and the RF processing unit 2j-10 may be referred to as a transmitter, a receiver, a transceiver, or a communication unit. Moreover, at least one of the baseband processing unit 2j-20 and the RF processing unit 2j-10 may include a plurality of communication modules to support a plurality of different radio access technologies. At least one of the baseband processing unit 2j-20 and the RF processing unit 2j-10 may include different communication modules to process signals in different frequency bands. For example, the different radio access technologies may include a wireless LAN (e.g., IEEE 802.11), a cellular network (e.g., LTE), and the like. Further, the different frequency bands may include a super high frequency (SHF) (e.g., 2. NRHz, NRhz) band and a millimeter wave (e.g., 60 GHz) band.

The storage unit 2j-30 stores data, such as a default program, an application program, and configuration information, for operation of the terminal. Particularly, the storage unit 2j-30 may store information related to a second access node that performs wireless communication by using a second radio access technology. The storage unit 2j-30 provides stored data in response to a request of the controller 2j-40.

The controller 2*j*-40 controls overall operations of the terminal. For example, the controller 2*j*-40 transmits or receives a signal via the baseband processing unit 2*j*-20 and the RF processing unit 2*j*-10. The controller 2*j*-40 records and reads data in the storage unit 2*j*-40. To this end, the controller 2*j*-40 may include at least one processor. For example, the controller 2*j*-40 may include a communication processor (CP) configured to perform control for communication and an application processor (AP) configured to control an upper layer, such as an application program.

Figure 2K:
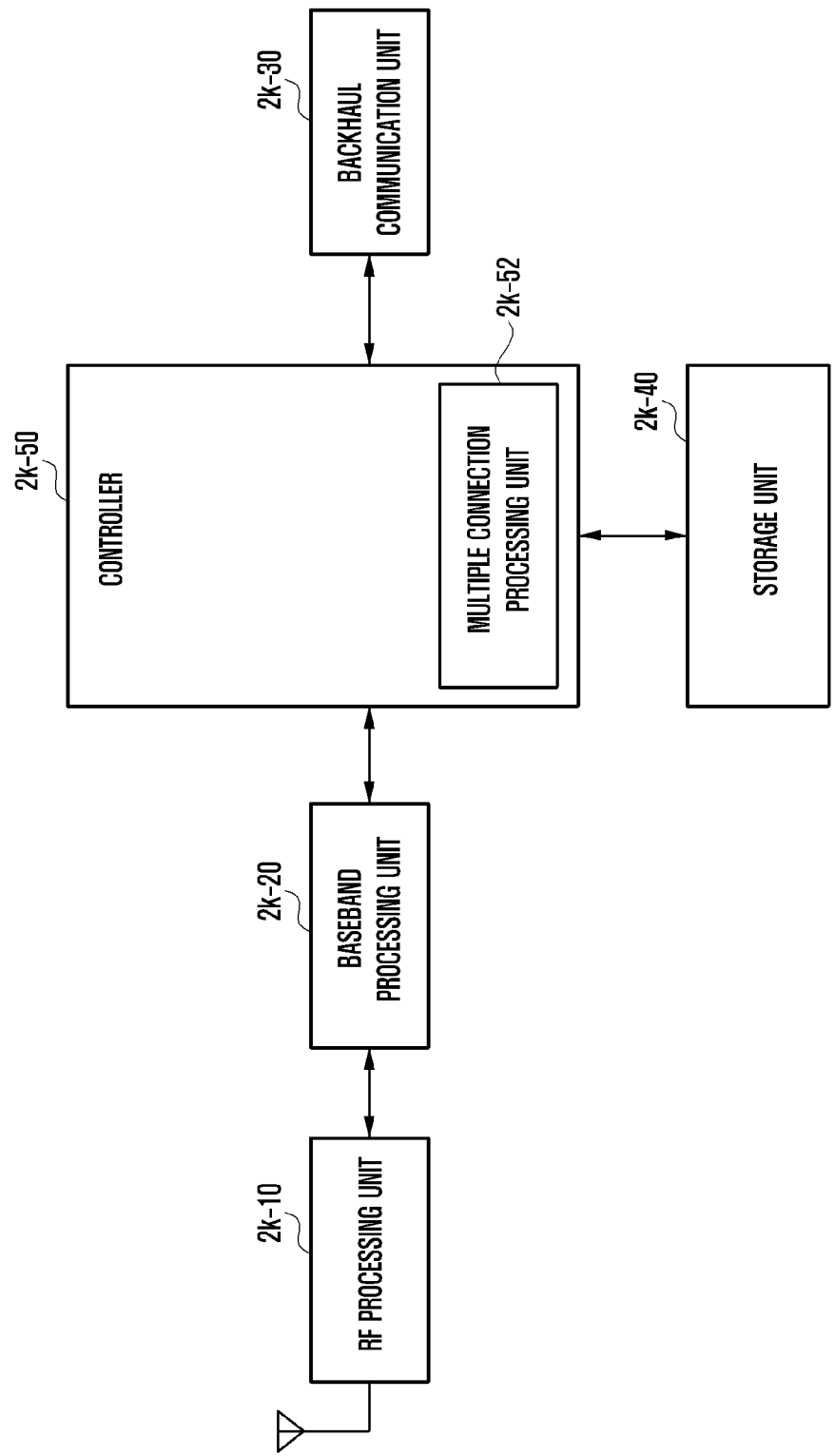
FIG. 2K is a block diagram illustrating a configuration of a base station according to the disclosure.

FIG. 2K illustrates a block configuration of a main base station in a wireless communication system according to an embodiment of the disclosure.

As illustrated in FIG. 2K, the base station includes an RF processing unit 2*k*-10, a baseband processing unit 2*k*-20, a backhaul communication unit 2*k*-30, a storage unit 2*k*-40, and a controller 2*k*-50.

The RF processing unit 2*k*-10 performs a function for transmitting or receiving a signal via a radio channel, such as band conversion and amplification of the signal. That is, the RF processing unit 2*k*-10 up-converts a baseband signal provided from the baseband processing unit 2*k*-20 into an RF band signal, transmits the converted RF band signal via an antenna, and then down-converts the RF band signal received via the antenna into a baseband signal. For example, the RF processing unit 2*k*-10 may include a transmission filter, a reception filter, an amplifier, a mixer, an oscillator, a DAC, an ADC, and the like. In FIG. 2K, only one antenna is illustrated, but a first access node may include a plurality of antennas.

The RF processing unit 2*k*-10 may include a plurality of RF chains. The RF processing unit 2*k*-10 may perform beamforming. For beamforming, the RF processing unit 2*k*-10 may adjust a phase and a magnitude of each of signals transmitted or received via the plurality of antennas or antenna elements. The RF processing unit may perform a downlink MIMO operation by transmitting one or more layers.

The baseband processing unit 2*k*-20 performs a function of conversion between a baseband signal and a bitstream according to a physical layer specification of a first radio access technology. For example, during data transmission, the baseband processing unit 2*k*-20 generates complex symbols by encoding and modulating a transmission bitstream. During data reception, the baseband processing unit 2*k*-20 reconstructs a reception bitstream via demodulation and decoding of the baseband signal provided from the RF processing unit 2*k*-10. For example, in a case of conforming to an OFDM scheme, during data transmission, the baseband processing unit 2*k*-20 generates complex symbols by encoding and modulating a transmission bitstream, maps the complex symbols to sub-carriers, and then configures OFDM symbols by performing IFFT operation and CP insertion. Further, during data reception, the baseband processing unit 2*k*-20 divides the baseband signal provided from the RF processing unit 2*k*-10 in units of OFDM symbols, reconstructs the signals mapped to the sub-carriers via an FFT operation, and then reconstructs the reception bitstream via demodulation and decoding.

The baseband processing unit 2*k*-20 and the RF processing unit 2*k*-10 transmit and receive signals as described above. Accordingly, the baseband processing unit 2*k*-20 and the RF processing unit 2*k*-10 may be referred to as a transmitter, a receiver, a transceiver, a communication unit, or a wireless communication unit.

The backhaul communication unit 2*k*-30 provides an interface that performs communication with other nodes within a network. That is, the backhaul communication unit 2*k*-30 converts, into a physical signal, a bitstream transmitted from the main base station to another node, such as an auxiliary base station and a core network, and converts a physical signal received from the another node into a bitstream.

The storage unit 2*k*-40 stores data, such as a default program for operation of the main base station, an application program, and configuration information. Particularly, the storage unit 2*k*-40 may store information on a bearer assigned to a connected terminal, a measurement result reported from the connected terminal, and the like. The storage unit 2*k*-40 may store information serving as a criterion for determining whether to provide the terminal with multiple connections or to suspend the same. The storage unit 2*k*-40 provides stored data in response to a request of the controller 2*k*-50.

The controller 2*k*-50 controls overall operations of the main base station. For example, the controller 2*k*-50 transmits or receives a signal via the baseband processing unit 2*k*-20 and the RF processing unit 2*k*-10 or via the backhaul communication unit 2*k*-30. The controller 2*k*-50 records and reads data in the storage unit 2*k*-40. To this end, the controller 2*k*-50 may include at least one processor.

The embodiments of the disclosure described and shown in the specification and the drawings have been presented to easily explain the technical contents of the disclosure and help understanding of the disclosure, and are not intended to limit the scope of the disclosure. That is, it will be apparent to those skilled in the art that other modifications and changes may be made thereto on the basis of the technical idea of the disclosure. Further, the above respective embodiments may be employed in combination, as necessary. For example, the embodiments of the disclosure may be partially combined to operate a base station and a terminal. Further, although the above embodiments have been described by way of the LTE/LTE-A system, other variants based on the technical idea of the embodiments may be implemented in other systems such as 5G and NR systems.

The invention claimed is:

1. A method performed by a terminal in a wireless communication system, the method comprising:
    performing a listen-before-talk (LBT) for uplink transmission;
    determining a radio link failure (RLF) based on an LBT failure being detected while performing the LBT;
    setting a cause value of the determined RLF to the LBT failure; and
    transmitting, to a base station, an RLF report including the cause value.

2. The method of claim 1, wherein the determining of the RLF comprises:
    determining the RLF in case that a number of detected LBT failures is equal to or more than a preconfigured number,
    wherein the preconfigured number is configured in advance by the terminal or is configured based on information received from the base station.

3. The method of claim 1, wherein the determining of the RLF comprises:
    starting a predetermined timer in case that a number of detected LBT failures is equal to or more than a preconfigured number; and
    determining the RLF in case that the predetermined timer expires.

4. The method of claim 1, further comprising:
transmitting, to the base station, a first radio resource control (RRC) message;
receiving, from the base station, a second RRC message in response to the first RRC message;
transmitting, to the base station, a third RRC message comprising an indicator indicating RLF-related information;
receiving, from the base station, a message for requesting the RLF report; and
determining an SCG failure in case that the terminal detects the LBT failure in a second cell group (SCG).

5. A terminal in a wireless communication system, the terminal comprising:
a transceiver; and
a controller connected to the transceiver, wherein the controller is configured to:
perform a listen-before-talk (LBT) for uplink transmission;
determine a radio link failure (RLF) based on an LBT failure being detected while performing the LBT;
set a cause value of the determined RLF to the LBT failure; and
transmit, to a base station, an RLF report including the cause value.

6. The terminal of claim 5, wherein the controller is further configured to:
determine the RLF in case that a number of detected LBT failures is equal to or more than a preconfigured number,
wherein the preconfigured number is configured in advance by the terminal or is configured based on information received from the base station.

7. The terminal of claim 5, wherein the controller is further configured to:
start a predetermined timer in case that a number of detected LBT failures is equal to or more than a preconfigured number; and
determine the RLF in case that the predetermined timer expires.

8. The terminal of claim 5, wherein the controller is further configured to:
transmit, to the base station, a first radio resource control (RRC) message;
receive, from the base station, a second RRC message in response to the first RRC message;
transmit, to the base station, a third RRC message comprising an indicator indicating RLF-related information;
receive, from the base station, a message for requesting the RLF report; and
determine an SCG failure in case that the terminal detects the LBT failure in a second cell group (SCG).

9. A method performed by a base station in a wireless communication system, the method comprising:
receiving, from a terminal, a radio link failure (RLF) report including a cause value of an RLF,
wherein the RLF is determined based on a listen-before-talk (LBT) failure being detected while performing an LBT for uplink transmission, and
wherein the cause value of the RLF is set to the LBT failure.

10. The method of claim 9,
wherein the RLF is determined in case that a number of detected LBT failures is equal to or more than a preconfigured number, and
wherein the preconfigured number is configured in advance by the terminal or is configured based on information received from the base station.

11. A base station in a wireless communication system, the base station comprising:
a transceiver; and
a controller connected to the transceiver, wherein the controller is configured to:
receive, from a terminal, a radio link failure (RLF) report including a cause value of an RLF,
wherein the RLF is determined based on a listen-before-talk (LBT) failure being detected while performing an LBT for uplink transmission, and
wherein the cause value of the RLF is set to the LBT failure.

12. The base station of claim 11,
wherein the RLF is determined in case that a number of detected LBT failures is equal to or more than a preconfigured number, and
wherein the preconfigured number is configured in advance by the terminal or is configured based on information received from the base station.

* * * * *